March 27, 1934.  G. V. ANDERSON  1,952,230
AUTOMATIC PROFILE MILLING MACHINE
Original Filed Aug. 1, 1927   15 Sheets-Sheet 1

Inventor
Gilbert V. Anderson
By his Attorneys

March 27, 1934. G. V. ANDERSON 1,952,230
AUTOMATIC PROFILE MILLING MACHINE
Original Filed Aug. 1, 1927  15 Sheets-Sheet 2
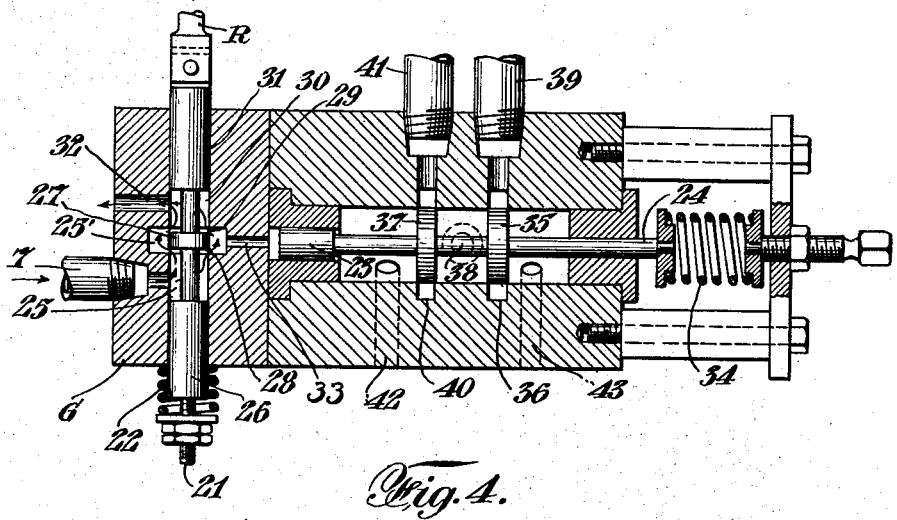
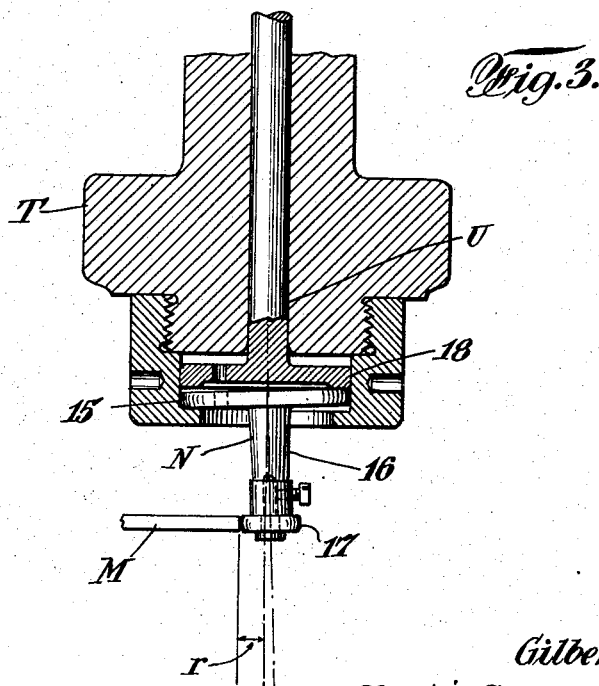
Inventor
Gilbert V. Anderson
By his Attorneys

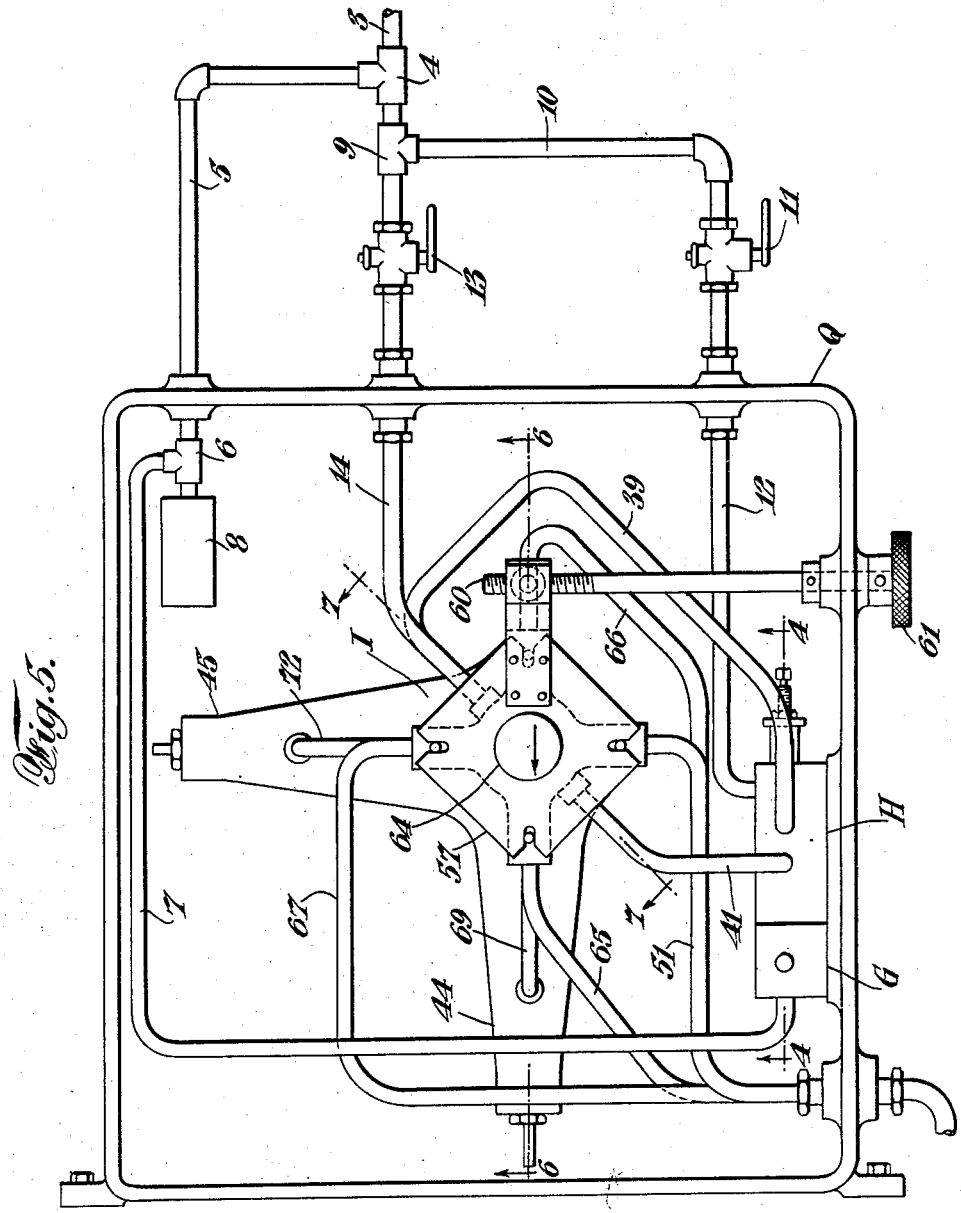

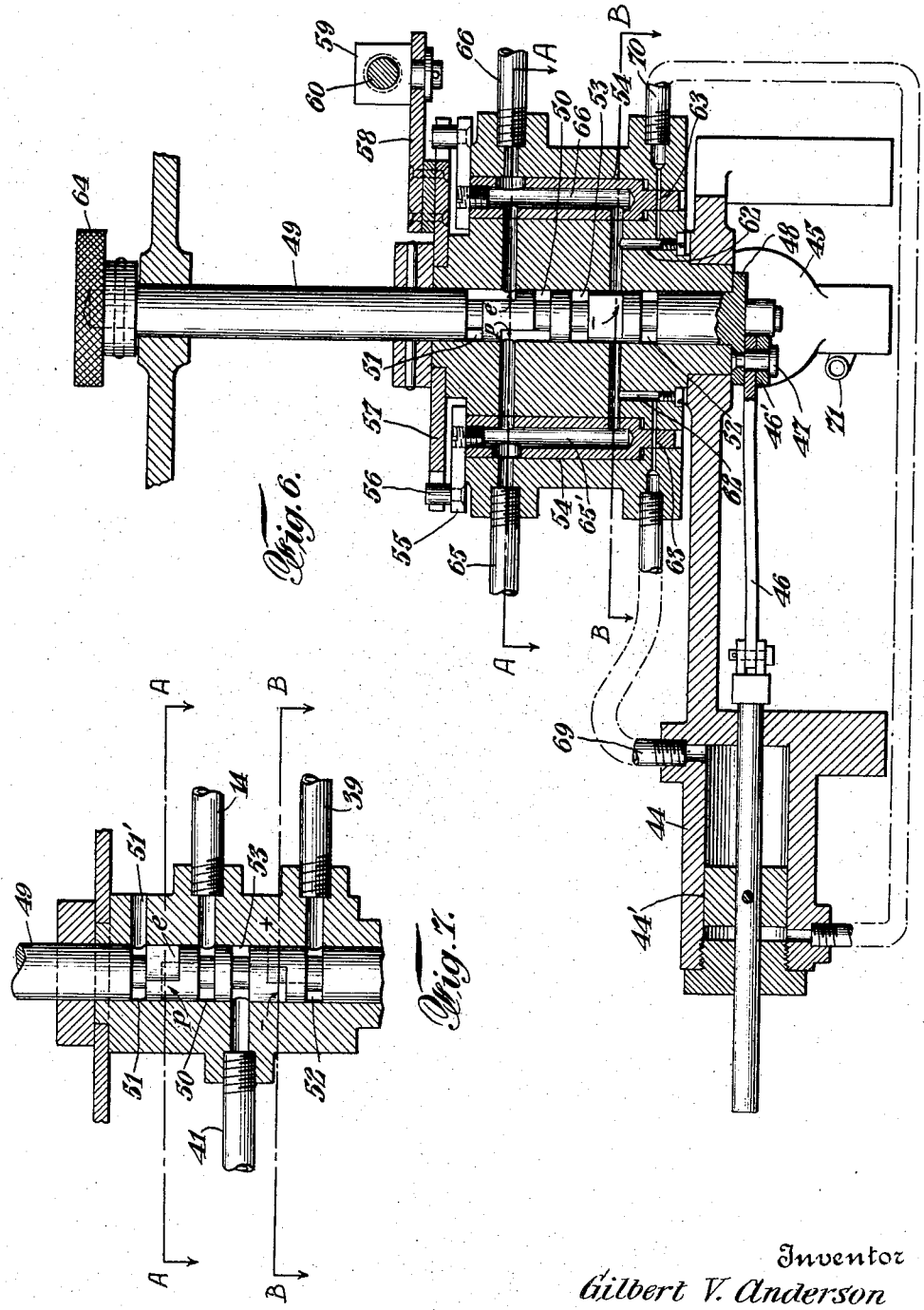

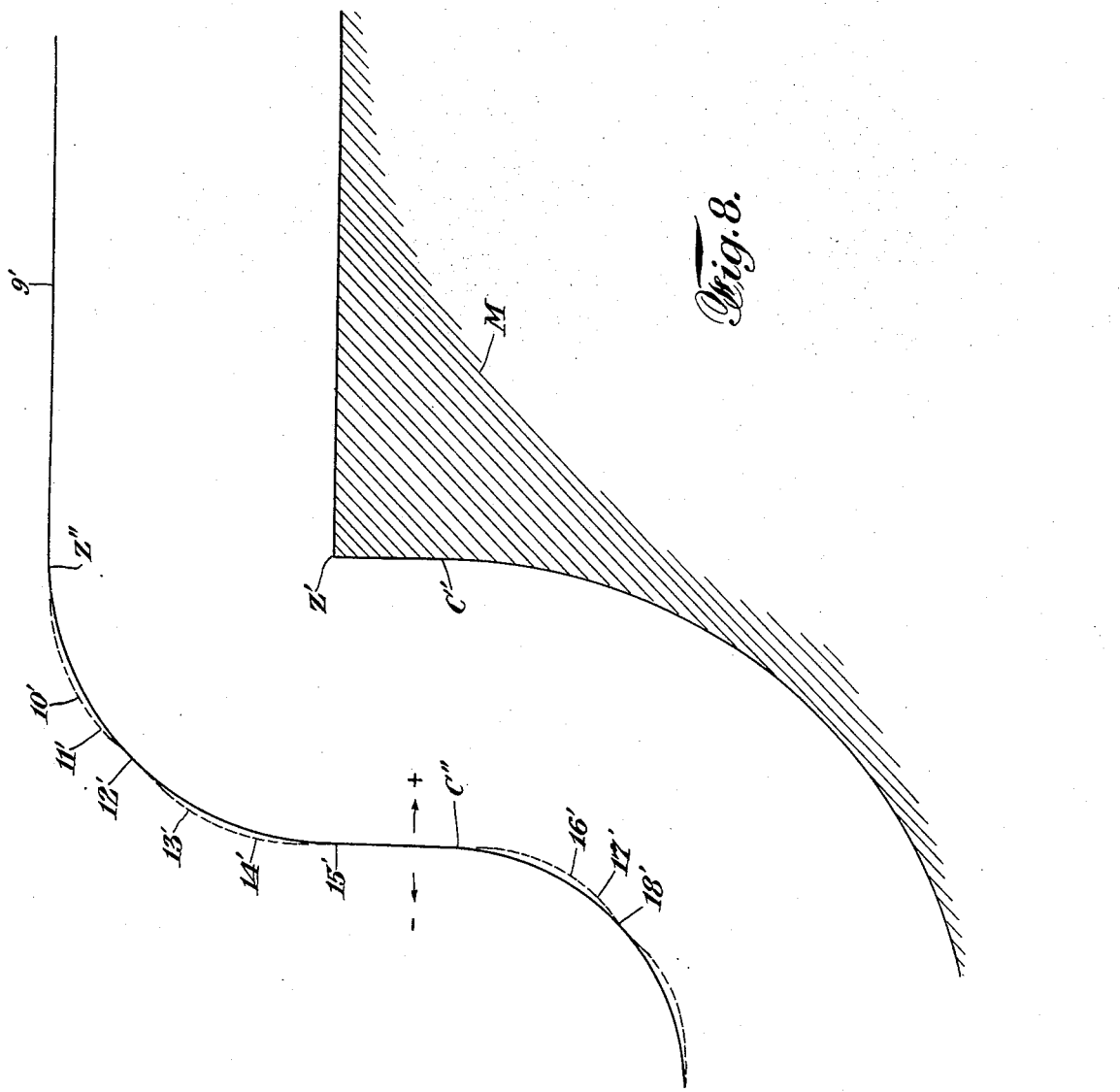

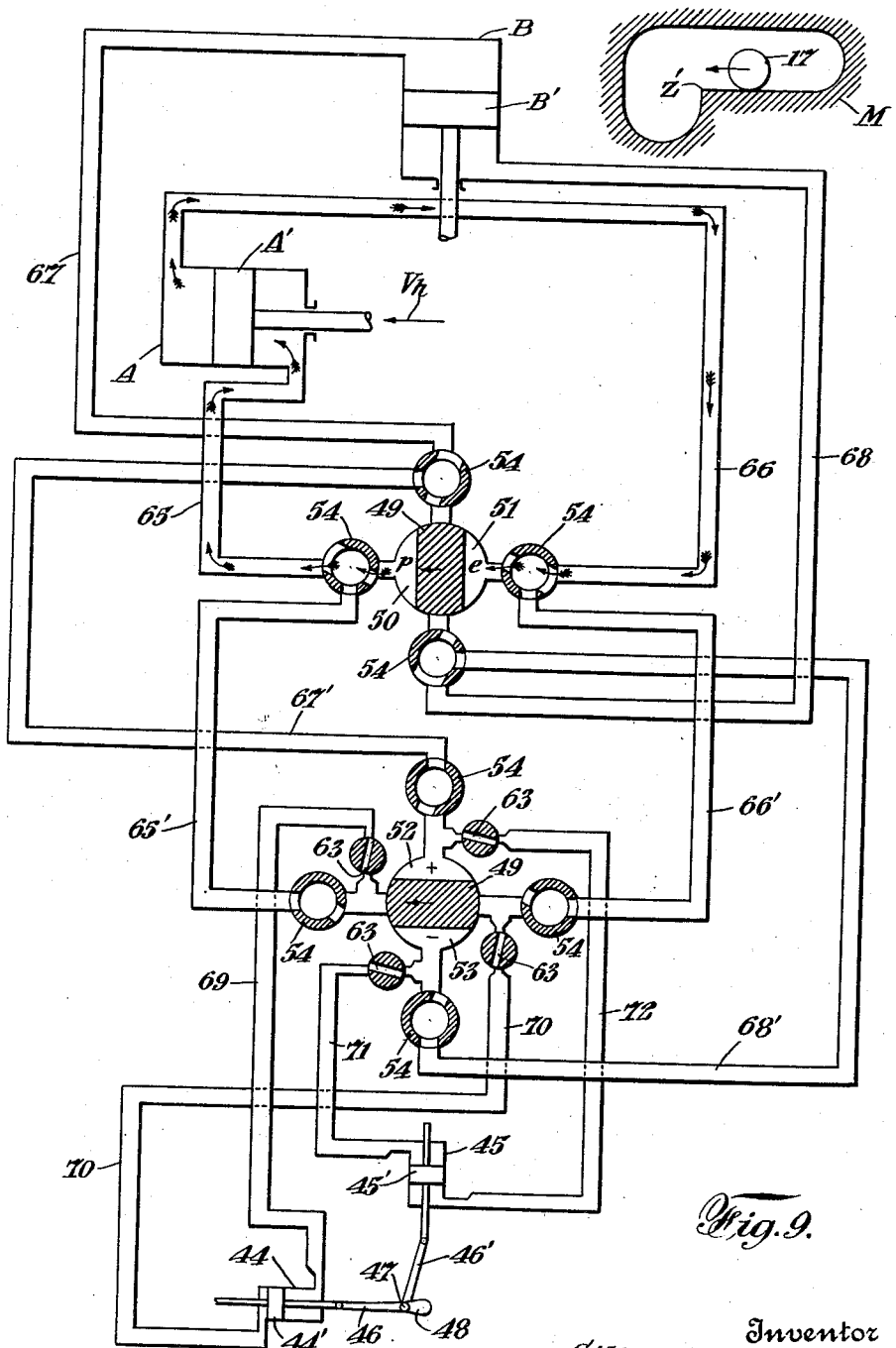

March 27, 1934.　　　G. V. ANDERSON　　　1,952,230
AUTOMATIC PROFILE MILLING MACHINE
Original Filed Aug. 1, 1927　　15 Sheets-Sheet 7

Inventor
Gilbert V. Anderson
By his Attorneys
Edwards, Lazer + Bower

March 27, 1934.  G. V. ANDERSON  1,952,230
AUTOMATIC PROFILE MILLING MACHINE
Original Filed Aug. 1, 1927  15 Sheets-Sheet 15

Inventor
Gilbert V. Anderson
By his Attorneys
Edwards, Sager + Bower

Patented Mar. 27, 1934

1,952,230

UNITED STATES PATENT OFFICE 1,952,230

AUTOMATIC PROFILE MILLING MACHINE

Gilbert V. Anderson, Philadelphia, Pa., assignor, by mesne assignments, to The Cincinnati Milling Machine Company, Cincinnati, Ohio, a corporation of Ohio Application August 1, 1927, Serial No. 209,678
Renewed August 1, 1931

74 Claims. (Cl. 90—13.5)

This invention relates to milling machines and particularly to milling machines of the automatic profile type.

The object of this invention is to provide a milling machine that will automatically cut irregular shapes in metal with only the assistance of a master or template of the desired outline which is to be duplicated.

A further object of the invention is to provide an automatic profile milling machine wherein the cutting tool can be guided through its cutting operation at a constant predetermined rate of feed irrespective of the outline of the template.

A still further object of the invention is to provide a simple, automatic profile milling machine adapted to accurately and rapidly follow the template at any desired rate of speed of the cutting tool without the attention of a skilled operator.

Further objects of the invention particularly in the specific means used to attain these results will be apparent from the following specifications and accompanying drawings, in which, Fig. 1 is a front elevation of a milling machine embodying the invention.

Fig. 3 is an enlarged sectional view of the tracer head.

Fig. 4 is a vertical sectional view of one of the valve mechanisms taken on line 4—4 of Fig. 5.

Fig. 5 is a plan view of the valve mechanisms and their connections.

Fig. 6 is a vertical sectional view of the distributor valve mechanism taken on line 6—6 of Fig. 5.

Fig. 7 is a vertical sectional view of the distributor valve mechanism taken on line 7—7 of Fig. 5.

Fig. 8 is an enlarged fragmentary diagrammatic view of the master or template, and Figs. 9 to 18 inclusive are diagrammatic views of the hydraulic flow through the hydraulic system during the various positions of the controlling valve mechanism and the various corresponding positions of the tracer roll which controls the valve mechanisms.

Figure 1:
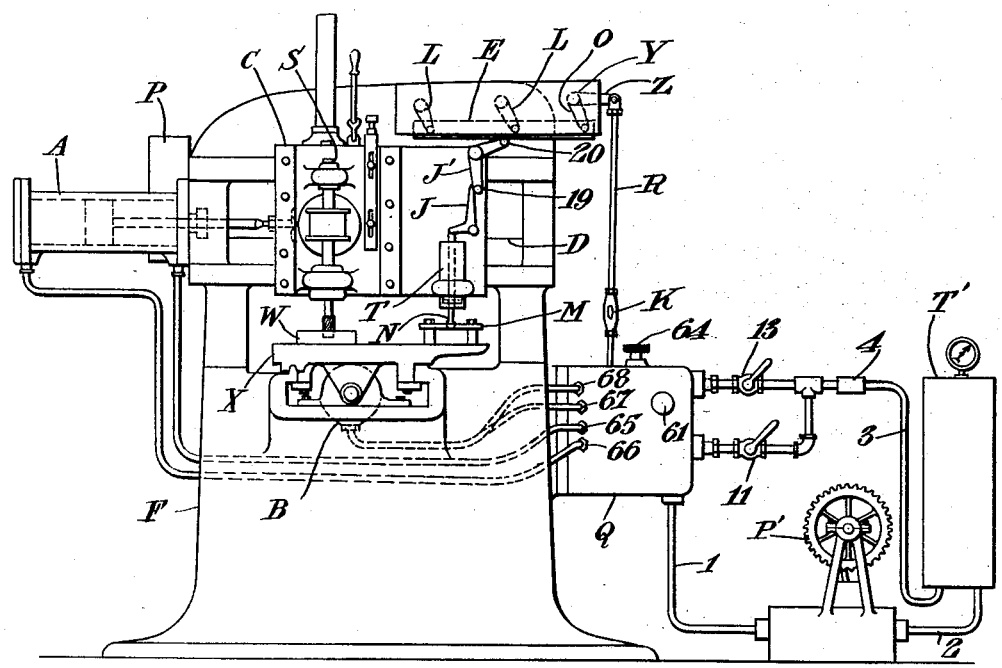
Figure 2:
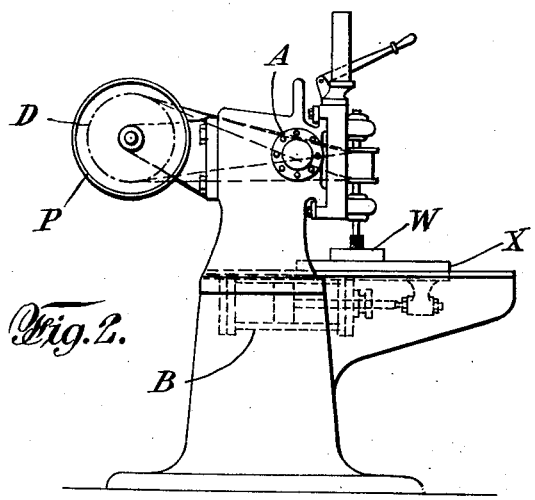
Fig. 2 is a side elevation of the milling machine shown in Fig. 1.

In the embodiment of the invention illustrated in the drawings, a milling machine is provided with a frame F on the head of which is slidably mounted the cutter carriage C having a spindle S for the cutter driven by a belt from a drum D at the rear of the machine which is driven by a pulley P. Mounted upon and movable with the cutter carriage C is the tracer head T. The cutter carriage C with the cutter and tracer head is moved to the right or left by the hydraulic cylinder A. The cutter is mounted at the lower end of the spindle S and engages the work W mounted on the work table X. The tracer head T engages the master or template M which is clamped to the work table X. The work table is moved forward and backward by the hydraulic cylinder B. Motion effected from the two cylinders A and B is controlled by valve mechanisms contained in a casing Q attached to the side of the frame F, while the fluid is circulated by a pump system. The motions imparted to the tracer head by the master determine the direction of the resultant motion produced by the cylinders A and B as will be more fully described hereafter.

The pump system comprises the pump P' which receives the fluid from the bottom of the casing Q which acts as a liquid sump. The liquid is drawn through the pipe 1 by the pump P' and discharged into pressure tank T' through pipe 2. The liquid travels under pressure from the pressure tank T' through pipe 3 to a point where it branches at T connection 4, a portion of the fluid passing through pipe connection 5 into the casing Q where it again branches at T connection 6, a portion of the fluid at this point passing thru pipe connection 7 to supply the primary valve mechanism G and another portion passing into a pressure relief valve 8 for maintaining approximately constant pressure and permitting the excess fluid to by-pass into the sump at the bottom of the casing Q. Beyond the T connection 4 a second T connection 9 diverts a portion of the fluid into the pipe connection 10 through shut-off valve 11 to the secondary valve mechanism H, and another portion of the fluid through shut-off valve 13 into the casing Q through the pipe connection 14 connected to the distributor valve mechanism I.

The distributor valve mechanism is for the purpose of directing the flow of fluid pressure to the cylinders A and B so as to direct the cutter in the outline of the master or template M. The secondary valve H actuates the distributor valve I and the primary valve G actuates the secondary valve mechanism H. The primary valve and the secondary valve work together as a unit, the displacements of the secondary valve magnify corresponding displacements of the primary valve.

The tracer mechanism comprises the tracer head T and the tracer button N consisting of a circular head 15 from the under side of which extends a tracer arm 16, the lower end of which has mounted thereon the roll 17. The master or template M engages the roll 17 and by its relative movements actuates the tracer mechanism. The motion of the master or template M tends to incline the arm 16 of the tracer button from its central position causing the tracer stem U to move upwardly by action of the circular head 15 which engages the flange 18 integral with and at the bottom of the tracer stem U. This motion is transmitted to the lower arm of the bell crank J, the upper arm of which engages a roll 19 on the lower end of the bell crank J'. A roll 20 mounted on the upper arm of the bell crank J' engages a movable bar E which is supported by the levers L and the lower arm O of the bell crank Y. The upper arm Z of the bell crank Y actuates the rod R which is connected to the spindle 21 of the primary valve. The primary valve is drawn downwardly by the coil spring 22 and, by the train of mechanism just described, the tension of the coil spring 22 tends to force the tracer stem U downwardly, therefore forcing the arm 16 of the tracer button N toward its central or perpendicular position. Movements of the master or template M which tend to push the arm 16 of the tracer button away from its central position and therefore force the primary valve upwardly are designated as positive displacements, and movements of the master or template M which recede from the roll 17 and permit spring 22 of the primary valve to return the arm 16 of the tracer button toward its central position and pull the primary valve downwardly are designated as negative displacements.

The primary valve G actuates the secondary valve H by means of variations in the pressure produced on the piston 23 of the secondary valve integral with and at the right hand end of the secondary valve stem 24. The fluid under pressure from the pressure tank T' is forced directly to the primary valve G through pipe connections 3, 5 and 7, the fluid entering the primary valve at the annular space 25 between the enlarged portions 26 and 27 of the primary valve from which it escapes through the opening 28 leading into the annular groove or port 25' surrounding the central enlarged portion 27 of the primary valve. The width of the enlarged portion 27 is slightly less than the width of the annular port 25', permitting escape of the fluid into the port 25' through the opening 28. The diameter of the enlarged portion 27 is considerably less than the diameter of the annular space 25', leaving a space therebetween for the fluid which can escape therefrom through the opening 29 into the annular space 30 between the enlarged portion 27 and the enlarged portion 31. A passage 32 is provided in the valve leading from the annular space 30 permitting escape of the fluid to the sump of the casing Q. Any upward movement of the stem 21 of the primary valve caused by a positive displacement of the tracer arm will increase the size of the opening 28 through which the fluid from pressure tank T' enters the annular space 25' and at the same time this same movement decreases the size of the opening 29 through which the fluid escapes from the annular passage 25', the result being an increase in the fluid pressure in the annular space 25' which, through the passage 33, is transmitted to the piston 23, forcing it to the right against the action of spring 34. Conversely, any downward movement of the primary valve stem 21 caused by a negative displacement of the tracer arm 16 will reduce the size of the opening 28 through which the fluid enters the annular space 25' and at the same time increases the size of the opening 29 through which the fluid escapes to the sump, the result being a reduction in the pressure in the annular space 25' which reduces the pressure on the piston 23 of the secondary valve permitting the spring 34 to force the secondary valve to the left. A positive displacement of the tracer arm, by pulling the primary valve stem 21 upwardly, causes a movement to the right of the secondary valve spindle 24 which causes the enlarged portion or step 35 of the secondary valve to uncover port 36, opening communication between the port and the space between the two enlarged portions or steps 35 and 37, permitting the pressure from the pressure tank to flow through pipe connections 10 and 12 and port 38 which communicates with this space, into port 36 and pipe connection 39 which is connected to the distributor valve I. The same movement of the secondary valve moves step 37 away from the port 40 opening communication to pipe connection 41 leading from the distributor valve, permitting escape of liquid from the pipe connection 41 to port 40, past the step 37 to passage 42 leading to the sump. A negative displacement of the tracer arm causes a movement to the left of the secondary valve which will cause the fluid to flow into pipe connection 41 to the distributor valve I and permit the fluid to escape from the distributor valve through pipe connection 39 to the right of step 35 and through passage 43 leading to the sump.

The adjustment of the primary valve relative to the tracer button is made by the turn buckle K so that when the secondary valve is in its neutral position the tracer button has a slight amount of inclination to the perpendicular shown exaggerated in Fig. 3, enabling it to register negative displacements.

The distributor valve mechanism I comprises a rotary valve structure operated by two hydraulic cylinders 44 and 45 provided with pistons 44' and 45'. The pistons are connected to a common crank pin 47 by means of connecting rods 46 and 46', the crank pin 47 being connected to crank 48 located at the lower end of the distributor valve stem 49. The distributor valve mechanism comprises two sections, a main or upper valve shown on line A—A of Figs. 6 and 7, and a lower or auxiliary valve shown on line B—B of Figs. 6 and 7. The main valve is connected directly to the pressure tank T' by the pipe connection 14 and controls what will be termed the "main flow" of the distributor valve mechanism. Pipe connection 14 leads directly to the annular groove or space 50 of stem 49 of the distributor valve mechanism. This annular groove leads upwardly to the pressure opening $p$ of the main valve. The main valve is also provided with an exhaust opening $e$ which leads upwardly to the annular groove 51 of stem 49 which has a communication 51' with the sump. The auxiliary valve is connected to the secondary valve H by means of pipe connections 39 and 41 and controls what will be termed the "auxiliary flow" of the distributor valve mechanism. Pipe connection 39 leads to the annular groove 52 on the valve stem 49 upwardly to the positive opening + of the auxiliary valve. The pipe connection 41 from the secondary valve H communicates with the annular groove 53 which leads downwardly to the negative opening — of the auxiliary valve. The purpose of the main valve is at all times to so direct the flow of fluid pressure to the main operating cylinders A and B as to give approximately the required direction to the resultant motion of the tracer and cutter. The purpose of the auxiliary valve with the openings placed at right angles to the main valve is to modify the flow of fluid caused by the main valve so as to cause it to give exactly the required direction to the resultant motion of the tracer and cutter. The auxiliary valve is also a means for regulating the flow of fluid pressure to the cylinders 44 and 45 acting on the crank 48 at the lower end of the valve stem of the distributor valve mechanism to cause the necessary rotation of the stem 49 at every change in outline of the master or template at which a change in the direction of the resultant force is required.

The rate of feed of the work to the cutter is controlled by four speed control valves 54 which control the openings leading from the main and auxiliary valves. These speed control valves 54 are provided with crank arms 55 and with crank pins 56 extending into openings in a rotatable plate 57. Attached to the plate 57 is an arm 58 carrying a screw block 59 operated by screw 60 extending through the casing Q and provided with a hand knob 61. The rotation of the knob 61 to the right or left rotates plate 57 which acts upon the crank pins extending above the speed control valves 54, rotating the four valves in unison so as to provide a means for regulating the rate of feed of the work against the cutter.

The flow from the auxiliary valve is branched, a portion going through the aperture 62 leading to restricted openings 63 of the speed control valves 54 which lead into the cylinders 44 and 45. The lower ends of the speed valve spindles are somewhat reduced and the passages 63 through them are made relatively small so that the openings for any given setting of the speed valve will be considerably smaller relative to the opening to the upper sections of the speed valves at the main and auxiliary valves so that the velocity of rotation of the valve stem 49 caused by the action of cylinders 44 and 45 will not be excessive. It is understood that all of the openings controlled by the control valves 54 close and open in unison. The distributor valve stem 49 extends beyond the casing Q and is provided with a knob 64 for controlling the valve by hand when the machine is used as a plain hydraulic power fed milling machine, giving the relative motion of the cutting in any one of the four directions, the knob 64 being provided with an indicator to indicate relative motion that will be imparted to the cutter and tracer by the distributor valve mechanism. When the machine is used as a plain milling machine the valve 11 is shut off, as the primary valve G and the secondary valve H are then not necessary.

The distributor valve I is used to direct the motion in setting up the work preparatory to using the machine for automatic profiling in connection with the speed valves which are operated by the knob 61. The master or template M is brought to proper contact with the roll 17 of the tracer arm 16 by means of the distributor valve and speed control valves which are manually operated by the knobs 64 and 61 respectively. When proper contact is made the speed valves are closed and the valve 11 is opened so that the secondary valve H may function and cause automatic operation during profiling when the speed valves 54 are opened again by knob 61.

Figs. 9 to 18 inclusive are diagrammatic views showing the relation of the main and auxiliary valves during the operation of the milling machine, the openings of the main valve being designated $p$ and $e$ which are the pressure and exhaust openings, and the auxiliary valve openings designated $+$ and $-$ showing the positive and negative openings. A positive displacement of the tracer arm causes fluid pressure to flow from the pressure tank through pipe 39 and into the positive opening of the auxiliary valve, at the same time permitting fluid pressure to escape to the sump from the negative opening of the auxiliary valve connected with pipe connection 41. Conversely, a negative displacement of the tracer arm causes fluid to flow from the pressure tank to the negative opening of the auxiliary valve, permitting escape of fluid pressure to the sump from the positive opening.

Figs. 9 to 18 inclusive show diagrammatically the relation of the various parts in describing the various positions of the roll shown diagrammatically in the upper right hand corner of each figure. It is understood that in these various diagrammatic views the cutter and tracer only are represented as moving in the direction indicated, the work and master represented as being stationary. In practice, however, it is well known that in machines of various types in connection with which it may be desired to utilize the improved control the feed controls may in some cases move the tracer and cutter while the work and master or template remain stationary, whereas in other cases the work and master may be moved while the tracer and cutter remain stationary and, further, both the work and master and cutter and tracer may be moved for the desired feeds as is the case in the machine represented by the accompanying drawings.

At the intersection of the axes of the main or operating cylinders A and B on each of these diagrammatic views, a velocity diagram is shown which represents the various relative components and resultant velocities of the tracer and cutter with respect to the master and work. The horizontal and vertical components of the velocity of motion produced by the main flow are designated by the reference characters $Vh$, $Vv$ respectively, while the resultant velocity of these motions produced by the main flow will be represented by the reference character $Vr$. The horizontal and vertical components of the velocity produced by the auxiliary flow will be designated by the reference characters $Vh'$ and $Vv'$, respectively, while the resultant of these velocities will be represented by the reference character $Vr'$. The resultant of the main and auxiliary resultant velocities $Vr$ and $Vr'$ respectively will be represented by the reference character $Vr''$. This reference character $Vr''$ represents the actual relative velocity of the tracer and cutter with respect to the work and master when an auxiliary flow takes place, as shown in Figures 10, 11, 12, 13, 14, 16, 17 and 18, while the actual relative velocity will be represented by $Vv$ or $Vh$ when no auxiliary flow takes place, as in Figures 9 and 15. In these figures upward motions of the piston B' represent backward motions of the work table when viewing the machine as shown in Fig. 1, which would therefore produce a relative forward movement of the tracer and cutter and consequently in this case downward velocities are shown on the velocity diagrams. Conversely, the downward motions of piston B' of these views represent forward motions of the work table which would therefore produce relative backward movements of the tracer and cutter and consequently in this case upward velocities are shown on the velocity diagrams.

In Figure 9 the motion of the tracer and cutter is to the left as represented by the arrow at the tracer roll 17 in the upper right hand corner which shows the direction of the resultant relative motion of the tracer with respect to the master in all of the diagrammatic views of Figs. 9 to 18 inclusive. At the position of the roll 17 shown in Fig. 9 the main valve directs the flow from the pressure opening $p$ through the pipe connection 65 leading to the right side of the piston A' of the cylinder A, forcing it to the left, the return being through pipe connection 66 into the exhaust opening $e$. As the required motion in this case is parallel to the motion of the piston A', no motion is required of piston B' and the passages leading from the main valve to the cylinder B are closed. The passages leading from the auxiliary valve to the cylinder B are open as its openings are at right angles to those of the main valve but no flow will take place as the tracer arm 16 is in its neutral position and consequently the secondary valve stem 24 is also in its neutral position and no flow of liquid takes place. If there should be any displacement of the tracer arm because the line of the master should not be exactly parallel or a leakage be present, the resulting flow into the auxiliary valve would cause a motion of the piston B' at right angles to that produced by the piston A' such as would tend to restore the tracer arm to its neutral position and prevent further displacement. For example, if a slight positive displacement should occur due to any of the causes stated, such displacement would cause a flow of fluid into the positive opening of the auxiliary valve. This would direct the flow through passage 67', pipe connection 67 and into the top of cylinder B, causing a downward motion of the piston B', with a return flow through pipe connection 68 and passage 68' into the negative opening of the auxiliary valve which would lead to the sump. This downward movement of the piston B' would move the master away from the centre of the tracer head and tend to reduce or prevent further positive displacement of the tracer arm. If, on the other hand, a negative displacement should occur due to any of the causes above mentioned, such displacement would cause an upward movement of the piston B' which would move the master toward the centre of the tracer head and tend to reduce or prevent further negative displacement of the tracer arm. With the parts in the relation shown in Fig. 9, fluid pressure from the pressure opening of the main valve is transmitted through passage 65' to pipe connection 69, connected to the right end of cylinder 44, while the left end of cylinder 44 connects by means of pipe connection 70 and passage 66' with the exhaust opening of the main valve but this cannot cause rotation of the distributor valve stem because the pressure exerted on the crank pin 47 by the piston 44' is radial to the crank 48 at the lower end of the distributor valve stem and there is consequently no tangential component to cause rotation. It will be thus readily seen that at no angular position of the distributor valve can pressure from the main valve which is transmitted to the pistons of the small cylinders 44 and 45 by means of pipes attached thereto, cause rotation of the distributor valve spindle as the resulting pressure in every case will be approximately radial to the crank. This follows from the fact that the centre of the pressure opening $p$ of the main valve is situated at the same angular position about the centre of the distributor valve as the crank pin 47 is situated, so that the resultant pressure exerted upon the crank pin will always be approximately radial. In this connection it should be noted in the diagrammatic views, Figs. 9 to 18 inclusive, that the pipe connections and passages leading from the upper, right hand, lower and left hand openings, respectively, of both the main and auxiliary valves are arranged so that liquid leaving either valve in a given direction will produce motion of either of the operating pistons A' or B' in the same direction; also that pressure will be exerted on either of the smaller pistons 44' or 45' in the same direction. It should be noted further that as the positive and negative openings of the auxiliary valve face in directions at right angles to that of the pressure openings of the main valve, any flow from the auxiliary valve through the pipe connections connecting with one or both of the small cylinders 44 and 45 will cause rotation of the distributor valve stem as the resulting pressure exerted on the crank pin will be approximately tangent to the crank 48 and therefore cause rotation of the same.

Figure 10:
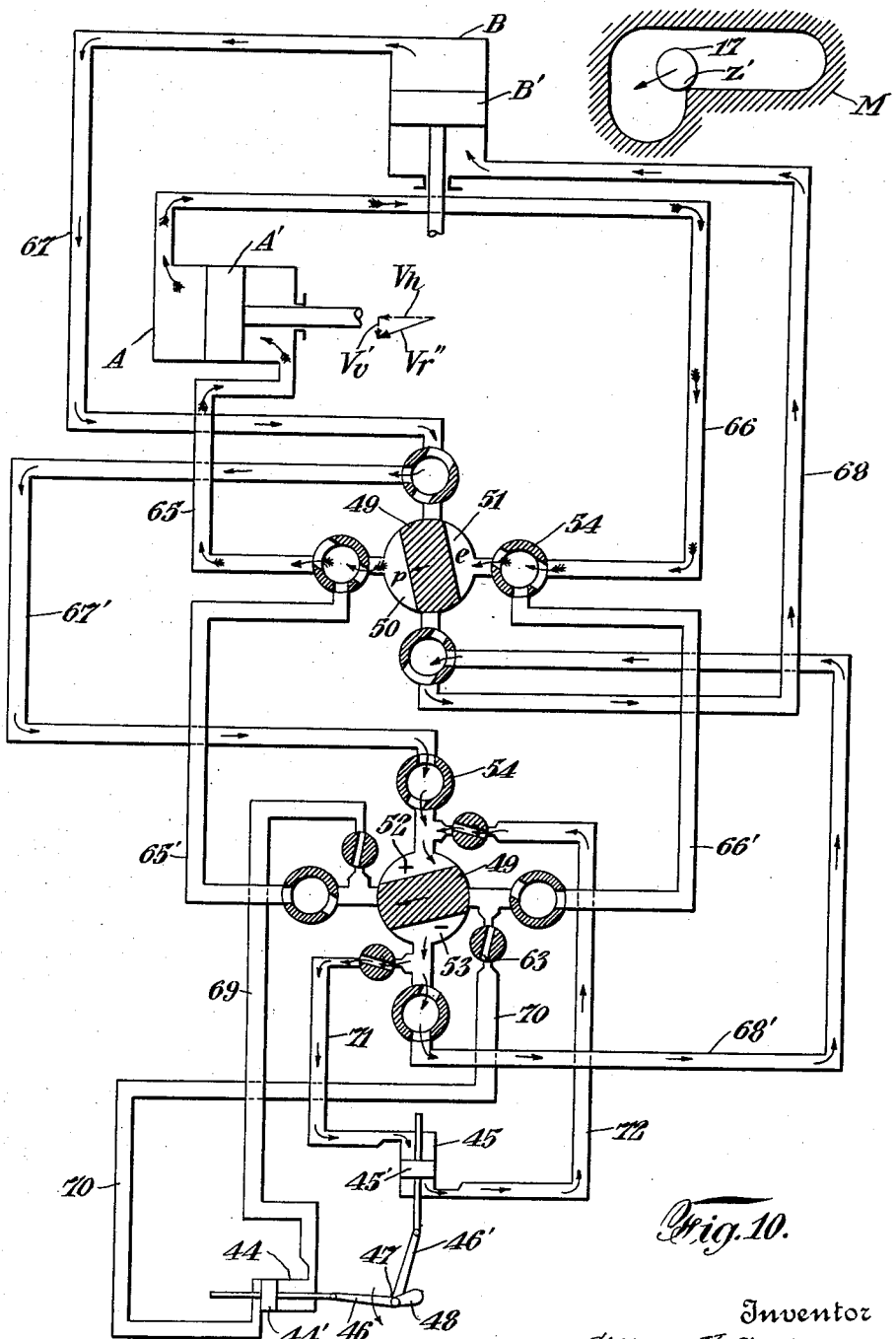

The motion shown in Fig. 9 continues until the roll 17 passes the corner Z' of the template and for a short distance in the same straight line but the spring 22 of the primary valve which causes the tracer roll 17 to bear against the master causes the tracer arm to move downward slightly which gives it a slight negative displacement with respect to its neutral position. This negative displacement causes, through the action of the primary and secondary valves, flow of fluid into the negative opening of the auxiliary valve which faces in a direction at right angles to the pressure opening of the main valve as shown in Fig. 10. This causes flow into passage 68' leading to pipe connection 68 which connects with the under side of the cylinder B causing an upward motion of the piston B', the fluid returning through pipe connection 67 leading to passage 67' and thence to the positive opening of the auxiliary valve from which it returns to the secondary valve and the sump. The upward motion of the piston B' causes a relatively downward motion of the tracer and cutter having a component V$v'$ at right angles to the motion V$h$ which is shown on Fig. 9 produced by the main flow giving the resultant relative motion V$r''$ leading downwardly as shown in Fig. 10. This change of the direction of the resultant motion of the tracer and cutter limits the amount of the negative displacement of the tracer arm. The flow of fluid into the negative opening of the auxiliary valve also causes flow into pipe connection 71 leading to the top of cylinder 45 causing downward motion of the piston 45'. The flow returns through pipe connection 72 to the positive opening of the auxiliary valve and from there to the sump. This downward motion of the piston 45' causes a slow counter clock-wise rotation of the distributor valve stem.

In Fig. 8 a portion of the master or template M is shown and above it a solid line 9', Z'', 12', 15', C'', and 18'; also is shown a dotted line Z'', 10', 11', 12', 13', 14', 15', C'', 16', 17' and 18'. The solid line shows the path that would be described by the centre of the tracer head T in describing the outline of the template or master if the tracer arm remained at its neutral position throughout. The dotted line shows the actual path described by the tracer head in describing the outline under the automatic action of the machine. The solid line is situated a distance r from the master as shown in Fig. 3. If the distance from the centre of the tracer head to the master becomes greater than r as shown by the dotted line of Fig. 8 from Z" to 12' and from 12' to 15', the tracer arm is displaced negatively. Conversely, if the distance from the centre of the tracer head to the master becomes less than r as shown by the dotted line from C" to 18' and beyond, the tracer arm is displaced positively. The numerals 9' to 18' inclusive along the dotted line show the position of the centre of the tracer head corresponding to the successive events illustrated in Figs. 9 to 18 inclusive. The distance between the solid and dotted lines shown in Fig. 8 shows the amount of displacements of the tracer arm at any point.

As motion continues beyond the point Z' it is evident that the downward component $Vv'$ shown in Fig. 10 will be increased, caused by an increasing negative displacement as represented in Fig. 8. Motion continues with an increase in the negative displacement and a corresponding increase in the downward component $Vv'$ until the counter clockwise rotation of the distributor valve spindle caused by the branched flow from the auxiliary valve to the small cylinder 45 has progressed to a point where the main valve uncovers the lower and upper passages connecting with the pipe connections 68 and 67 leading to and from the vertical operating cylinder B and the auxiliary valve uncovers the horizontal passages connected to the passages 66' and 65' leading to and from pipe connections 66 and 65 respectively which connect with the horizontal operating cylinder A and pipe connections 70 and 69 leading to and from small horizontal cylinder 44 as clearly shown in Fig. 11. The uncovering of the vertical passages of the main valve causes a main flow through the pipes leading to and from the vertical operating cylinder B, giving a downward component of motion $Vv$ as shown on the velocity diagram of Fig. 11.

The uncovering of the right-hand horizontal passage of the auxiliary valve leading to passage 66' permits fluid to flow through it to the restricted opening of the speed valve 54 between pipe connection 66 and the main distributor valve. This would increase the back pressure in pipe connection 66 if piston A' continued to move at the same velocity as before. Uncovering of the left-hand horizontal passage of the auxiliary valve leading to the passage 65' permits some of the fluid from the main flow into pipe connection 65 to escape through passage 65' into the positive opening of the auxiliary valve and to the sump. This would decrease the pressure in pipe connection 65 if piston A' continued to move at the same velocity. The net result of these auxiliary flows reduces the velocity of piston A' caused by the main flow which produces the horizontal component of motion $Vh$ to the left. This reduction in $Vh$ is represented on the velocity diagram by the separate component $Vh'$ to the right instead of by reduction in the length of $Vh$, and by this means it is possible to represent the effect of the auxiliary flow upon the resultant motion separate and distinct from that of the main flow. The net effect on the main flow is represented by the resultant $Vr$; that of the auxiliary flow by the resultant $Vr'$. The net effect of these two resultants combined is represented by the resultant $Vr''$ indicating the actual relative motion. It will be noted that the resultant of the motion produced by the auxiliary flow $Vr'$ is approximately at right angles to the resultant produced by the main flow.

Figure 11:
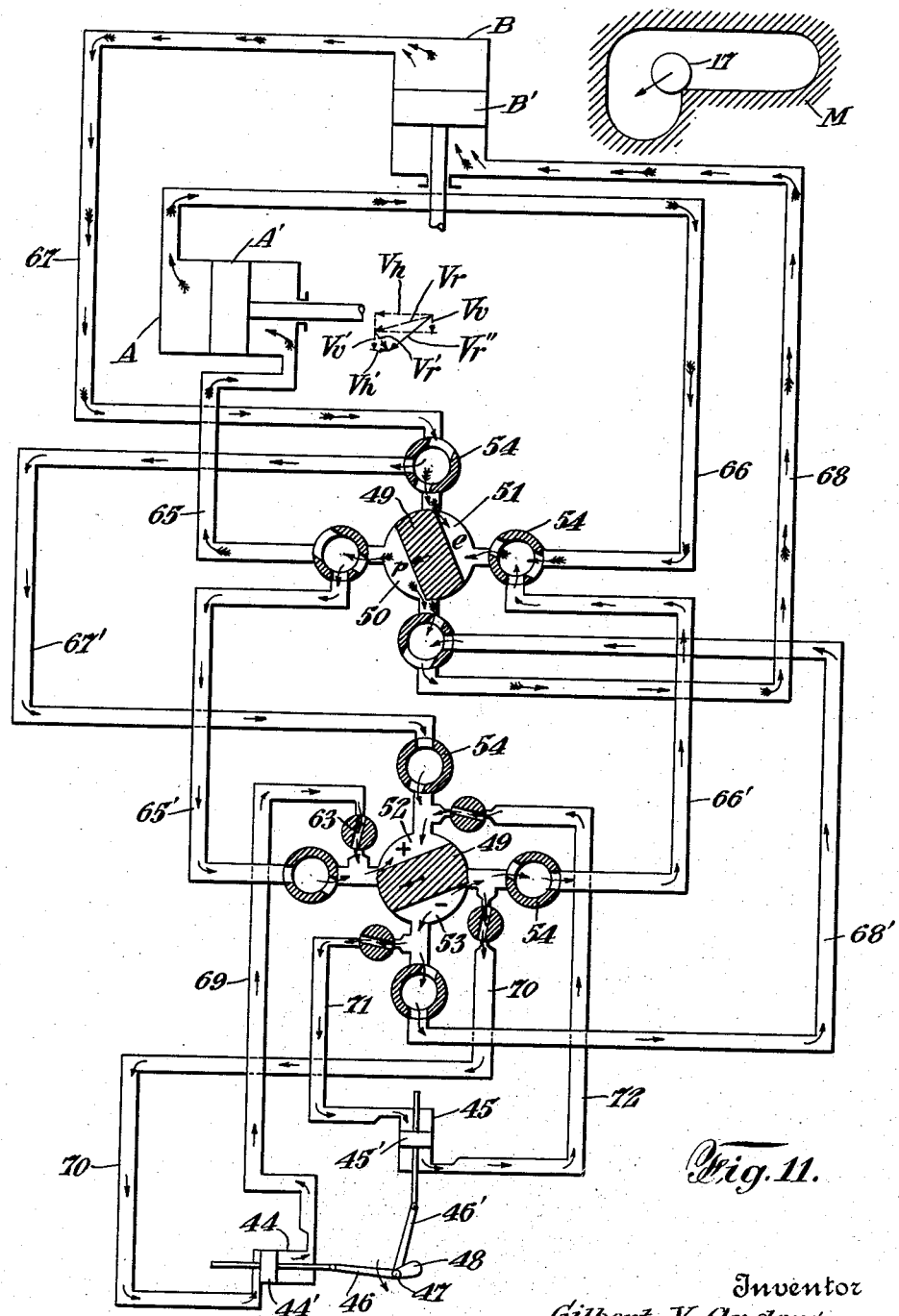
Figure 12:
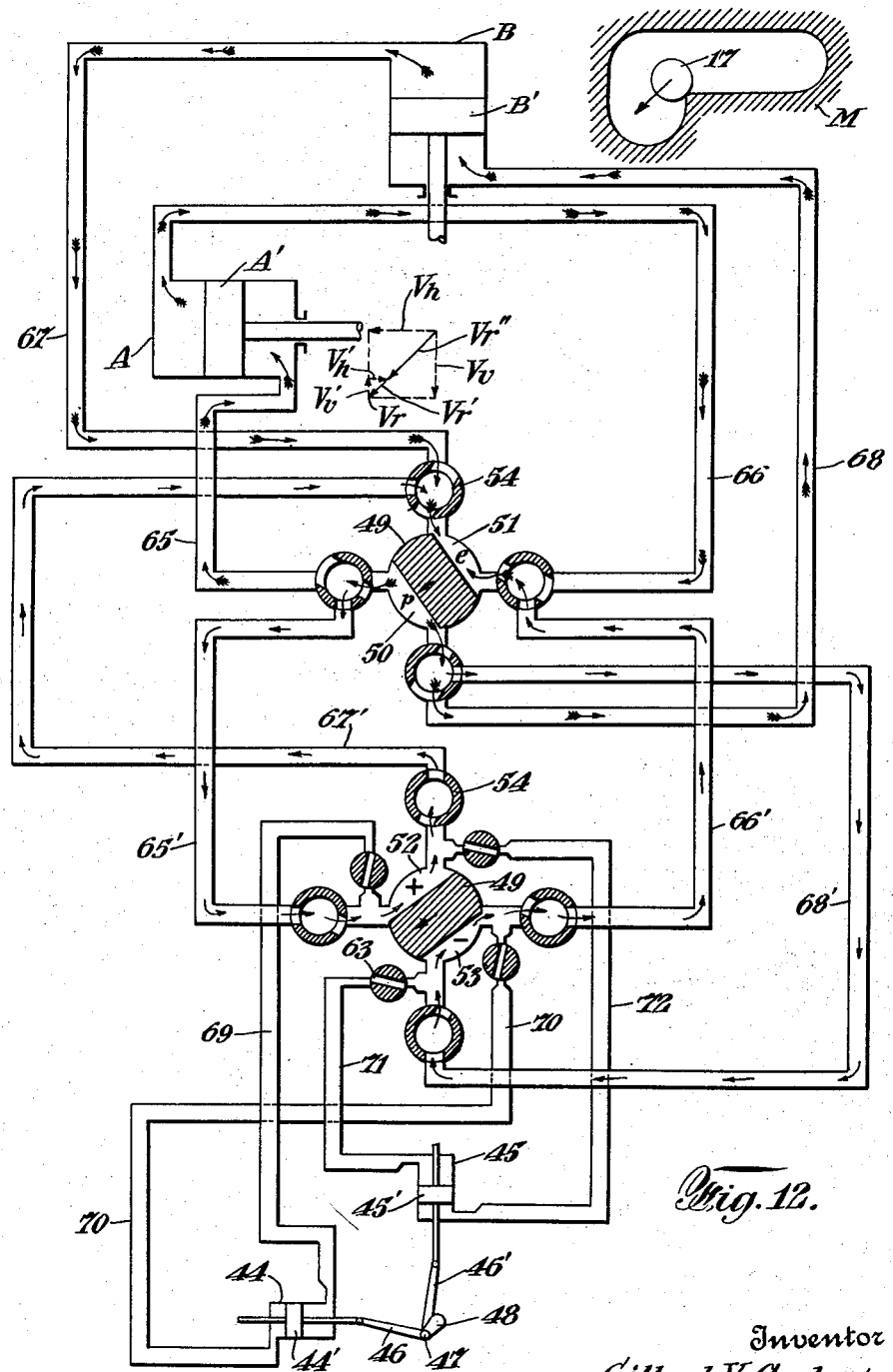
Figure 15:
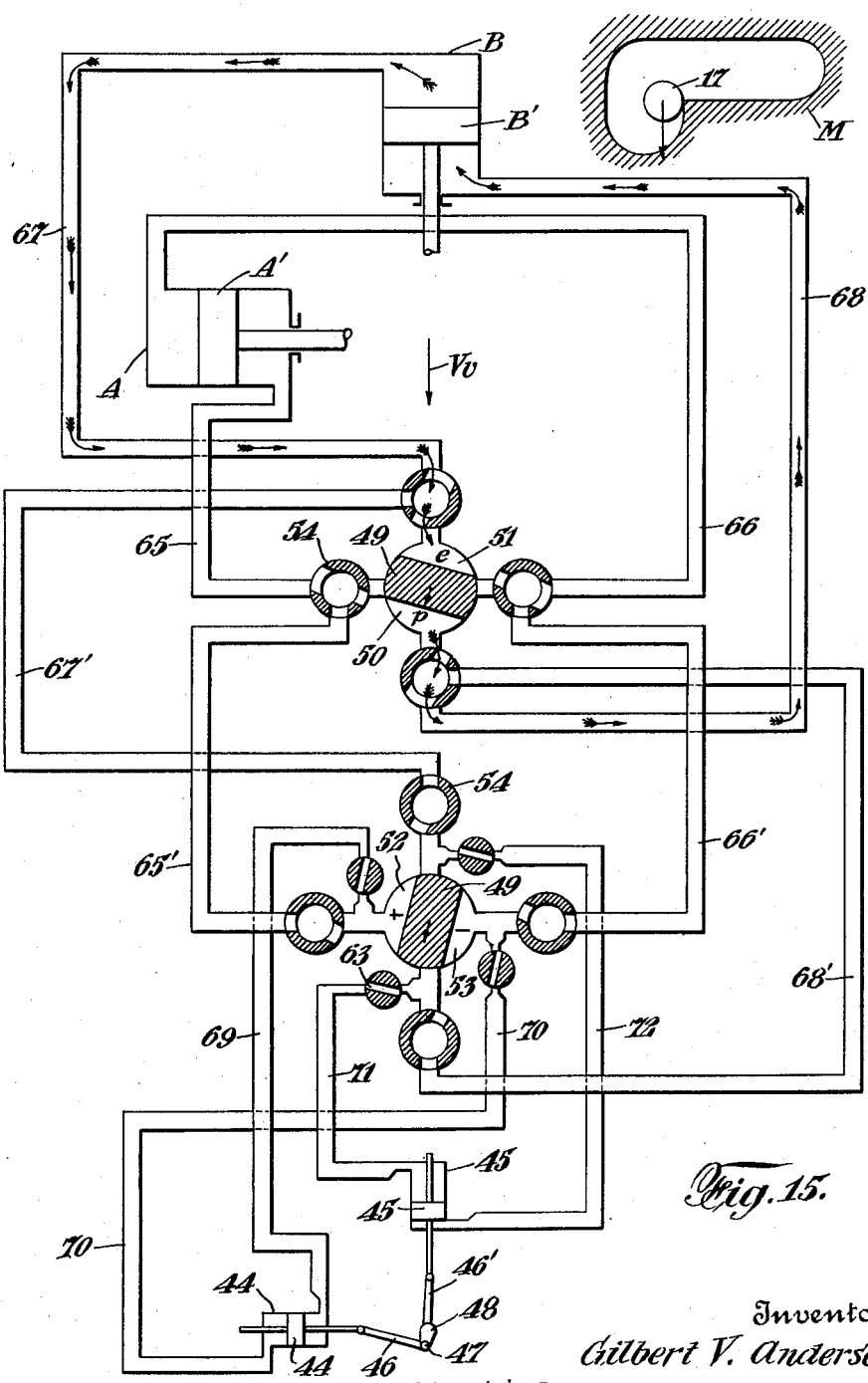

The uncovering of the horizontal passages of the auxiliary valve permits flow of the fluid into and from pipes 70 and 69 leading to and from the cylinder 44, forcing piston 44' to the right, enabling it to assist in rotation of the distributor valve stem 49. The negative displacement of the tracer arm increases from Z", Fig. 8, up to a point between 10' and 11' where the main and auxiliary valves uncover the remaining vertical and horizontal passages. Rotation of the distributor valve beyond this point causes a rapid increase in the opening of these remaining passages of the main and auxiliary valves which causes a rapidly increasing downward component of the motion $Vv$ produced by the main flow as shown in Fig. 11, aiding materially in changing the direction of the resultant motion downwardly or in a counter clockwise direction requiring a decreasing amount of auxiliary flow and resulting in a decreased amount of negative displacement of the tracer arm. When this motion has progressed to a point 12' of Fig. 8, the direction of the resultant motion has changed to 45° below the horizontal, the distributor valve having been rotated to approximately the same amount so that the horizontal and vertical passages of the main and auxiliary valves now have substantially the same amount of openings as shown in Fig. 12. The horizontal and vertical components of motion produced by the main flow are the same and therefore no auxiliary flow is required. The negative displacement of the tracer arm will therefore have been reduced to zero, as is represented on Fig. 8, 12', and consequently the secondary valve is in its neutral position and no flow takes place between it and the auxiliary valve of the distributor valve mechanism. In this case the fluid escaping from the pressure opening of the main valve through passage 65' into the positive opening of the auxiliary valve continues to flow into passage 67' leading back to the exhaust opening of the main valve to the sump. Fluid also escapes from the pressure opening of the main valve through passage 68' to the negative opening of the auxiliary valve and continues to flow from there into passage 66' leading back to the exhaust opening of the main valve and to the sump. The escape of the fluid from the pressure opening of the main valve through the two branches to the exhaust opening reduces the velocity of the horizontal and vertical components of motion produced by the main flow. The amount of these reductions in velocity is represented by $Vh'$ and $Vv'$ as shown on the velocity diagram of Fig. 12. The resultant velocity $Vr$ that would be produced by the main flow at 45° points would be about 41% greater than the horizontal or vertical component would be if there were no escaping or by-passing of the remaining flow. The by-passing is, however, an advantage as by regulating the amount of this by-passing, which can be done in the design of the speed valve by properly proportioning the relative area of the speed valve openings leading from the auxiliary valve to that of the speed valve openings leading from the main valve, the resultant velocity $Vr''$ produced can be made anything reasonably desired and can be made just equal to what the horizontal or vertical component of the main flow would be without by-passing, i. e., in this case, the main flow of both operating cylinders can be made the same as when the main flow occurs in one cylinder only as shown in Figs. 9 and 15. This by-passing takes place at all 45° points and, to a lesser extent, at a small distance on either side of the 45° points when the auxiliary flow is low. As the resultant velocity produced by the auxiliary flow is always approximately at right angles to the resultant velocity produced by the main flow, the increase or decrease of the magnitude of the resultant relative velocity $Vr''$ caused by the auxiliary flow would be small. Therefore the resultant relative velocity $Vr''$ produced at any angular position of the distributor valve would be approximately the same regardless of whether the main flow occurs through one operating cylinder only or whether the main and auxiliary flows occur through both operating cylinders or any combination. Therefore, the rate of feed of the machine would be substantially constant throughout the operation regardless of the shape of the template or master or the direction of motion of the tracer and cutter in reproducing the same.

Figure 13:
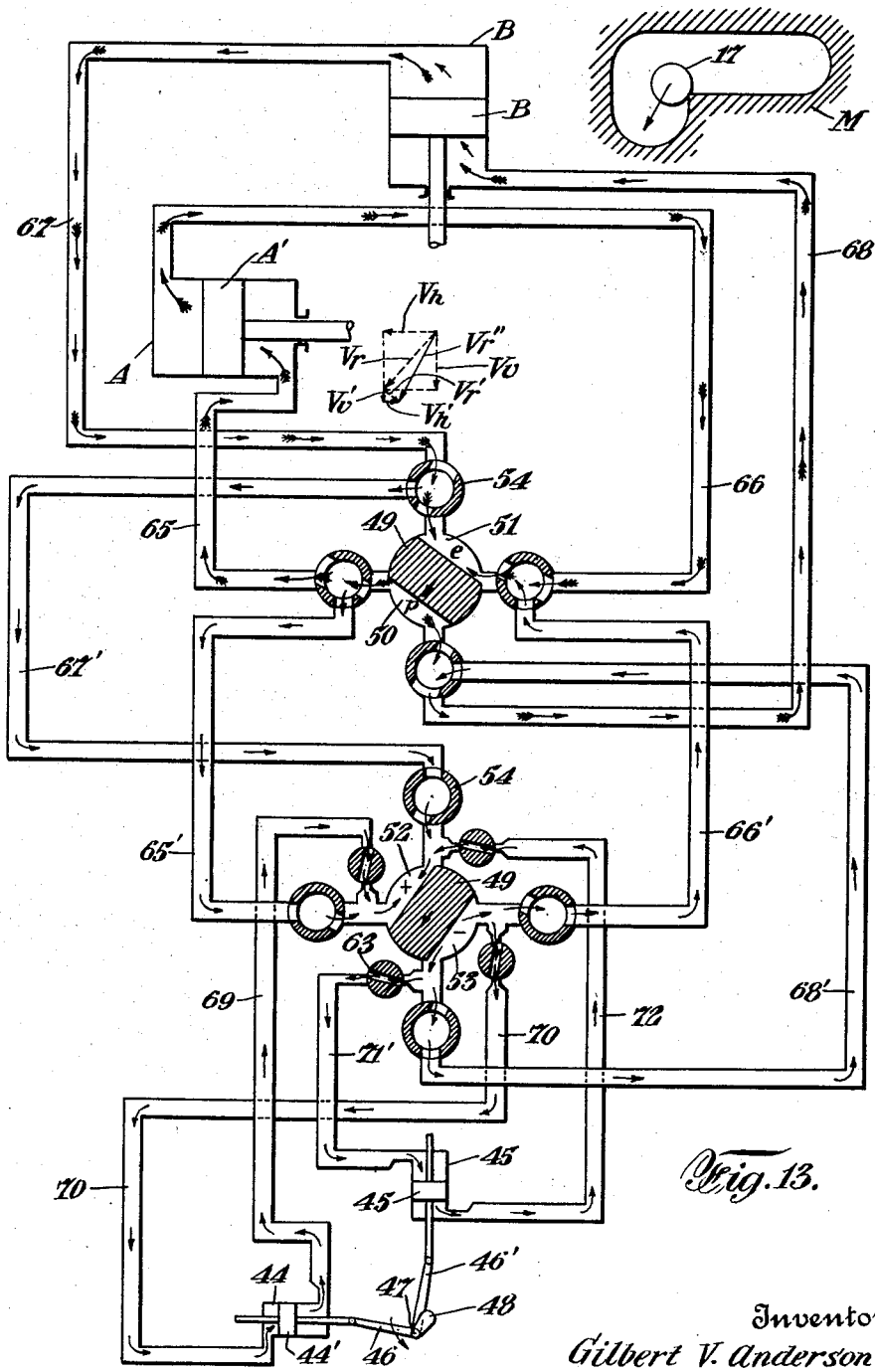
Figure 14:
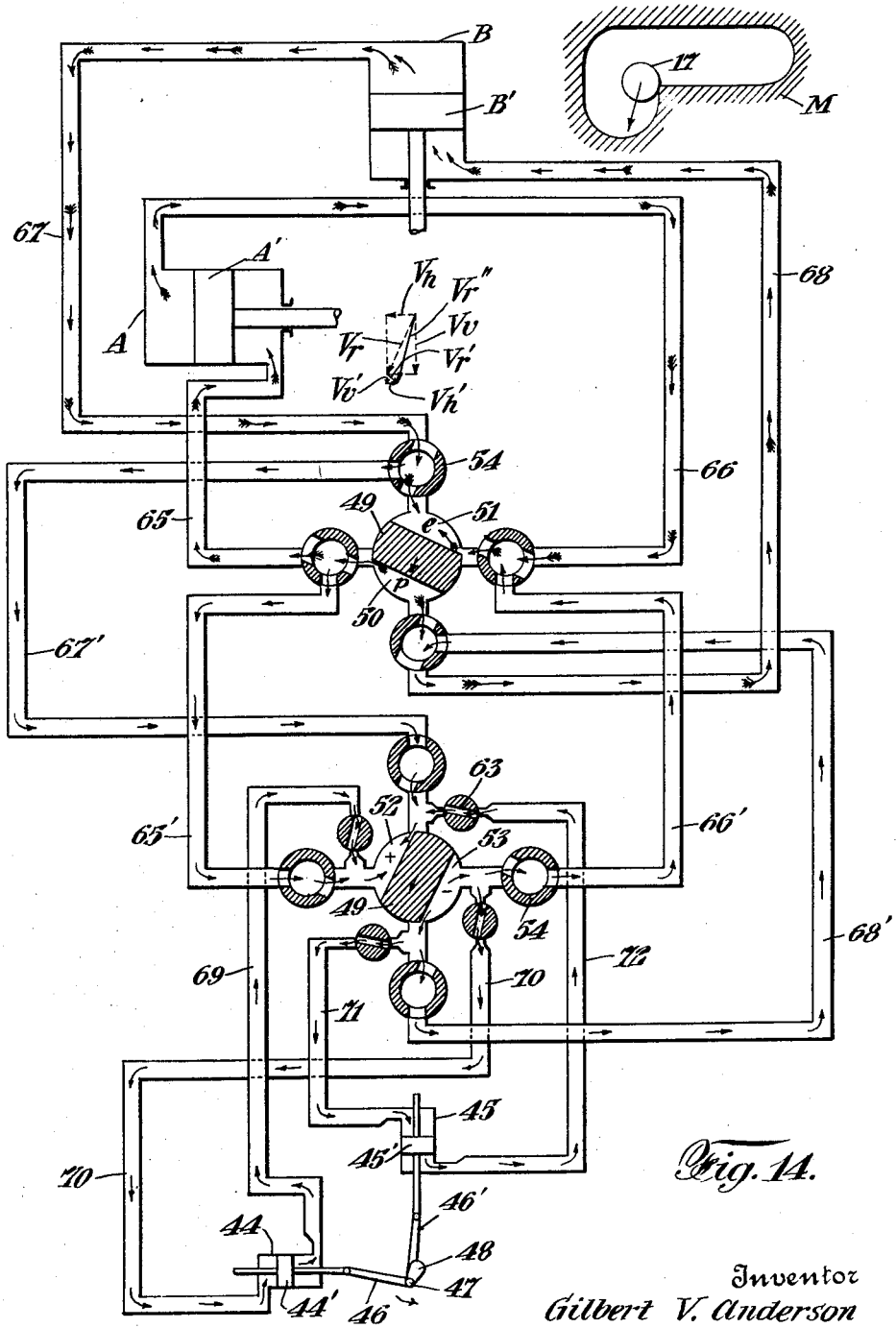
Figure 16:
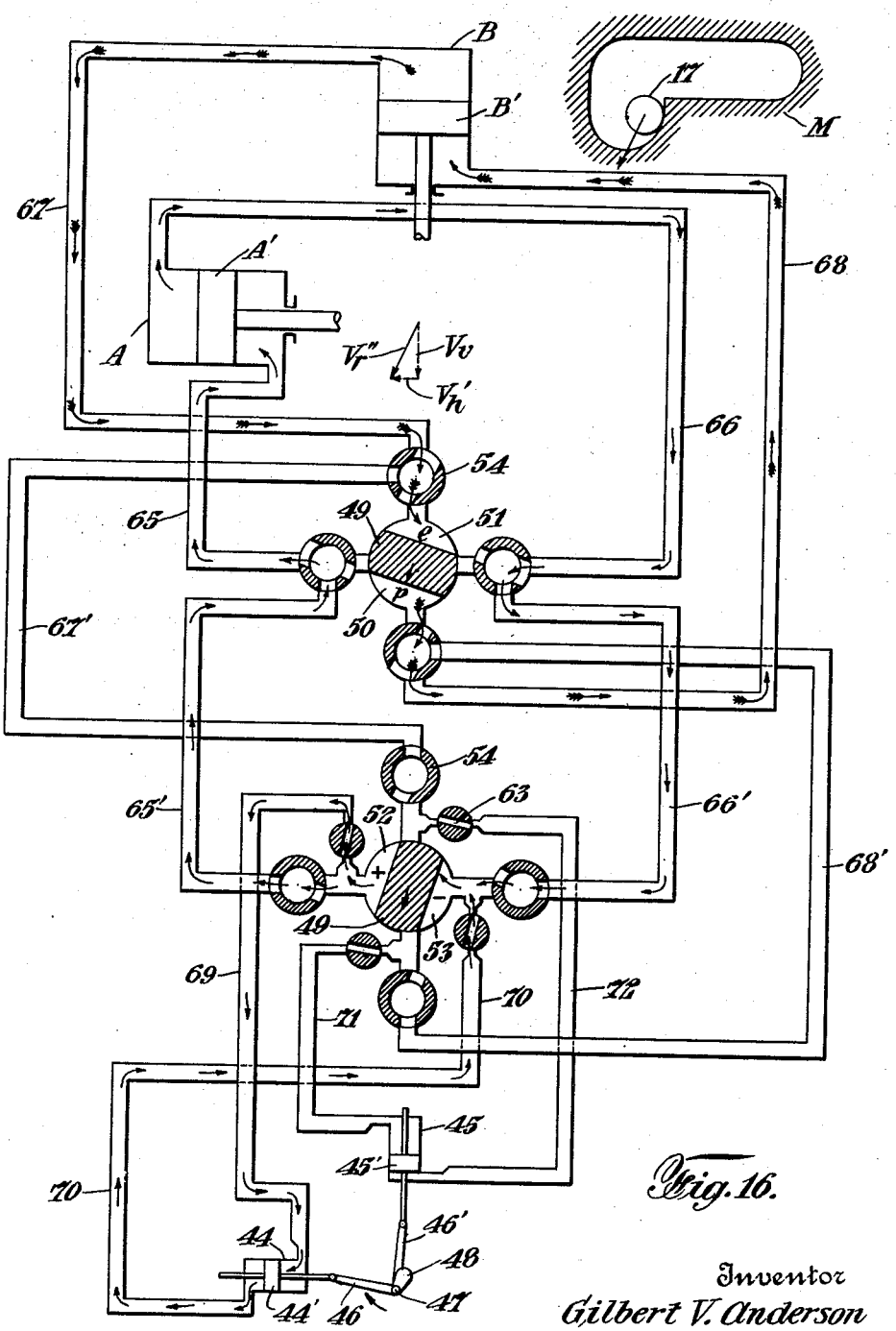

Motion continuing beyond the point illustrated in Fig. 12 in a straight line at 45° below the horizontal causes the master to recede from the tracer head and produce a negative displacement causing flow from the auxiliary valve as indicated in Fig. 13. This auxiliary flow produces a resultant $Vr'$ which is at right angles to the resultant $Vr$ produced by the main flow giving the resultant velocity $Vr''$ of the relative motion imparted to the tracer and cutter, the direction of which is to be changed still further in a counter clockwise direction limiting the amount of the negative displacement. The auxiliary flow also branches into the pipes connecting the cylinders 44 and 45 causing further rotation of the distributor valve stem 49. As this motion continues rotation of the distributor valve stem continues and the negative displacement increases until at some point as shown in Fig. 14 when the main and auxiliary valves have almost closed their horizontal and vertical passages respectively. Restriction of the horizontal passages of the main valve causes reduction of the horizontal component $Vh$ of the velocity produced by the main flow while restriction of the vertical passages of the auxiliary valve reduces the vertical component $Vv'$ produced by the auxiliary flow tending to keep the auxiliary resultant $Vr'$ at right angles to the main resultant $Vr$. As this motion continues beyond the point illustrated in Fig. 14, the horizontal and vertical passages of the main and auxiliary valve continue to close, causing still further counter clockwise change in the direction of the resultant motion and a decrease in the amount of negative displacement in the tracer arm until the point 15' of Fig. 8 is reached, corresponding to the arrangement of the valves shown in Fig. 15 when these passages are closed entirely and the negative displacement of the tracer arm has been reduced to zero. At 15' the motion is downward as shown in Fig. 15, and requires flow through the vertical operating cylinder B only. This motion continues until a point C' on the master or template is reached at which the curve extending to the left begins. When the centre of the tracer head reaches the point C'' corresponding to the point C' of the master at which the curve begins, continued motion in a downward direction causes a positive displacement of the tracer arm which causes a flow of fluid into the positive openings of the auxiliary valve as shown in Fig. 16. This causes a flow into passage 65' leading to pipe 65 connected with the cylinder A from whence the liquid returns through pipe 66 and passage 66' into the negative opening of the auxiliary valve and from there to the sump. This auxiliary flow causes piston A' to move to the left and produces the horizontal component of the auxiliary flow $Vh'$ as shown on the velocity diagram causing a clockwise change of the direction of the resultant relative motion imparted to the tracer and cutter represented by $Vr''$ which limits the amount of positive displacement of the tracer arm.

Figure 17:
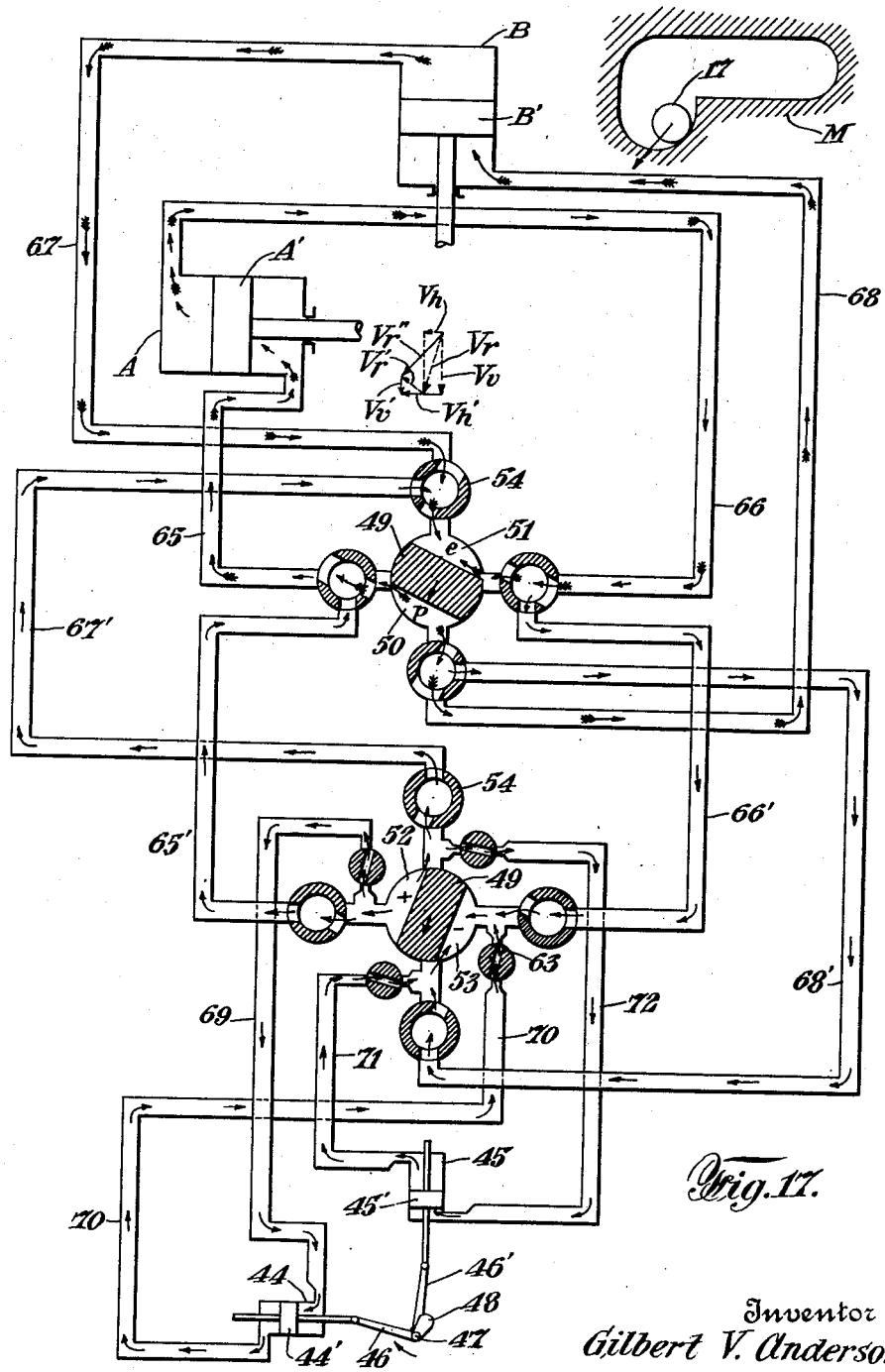
Figure 18:
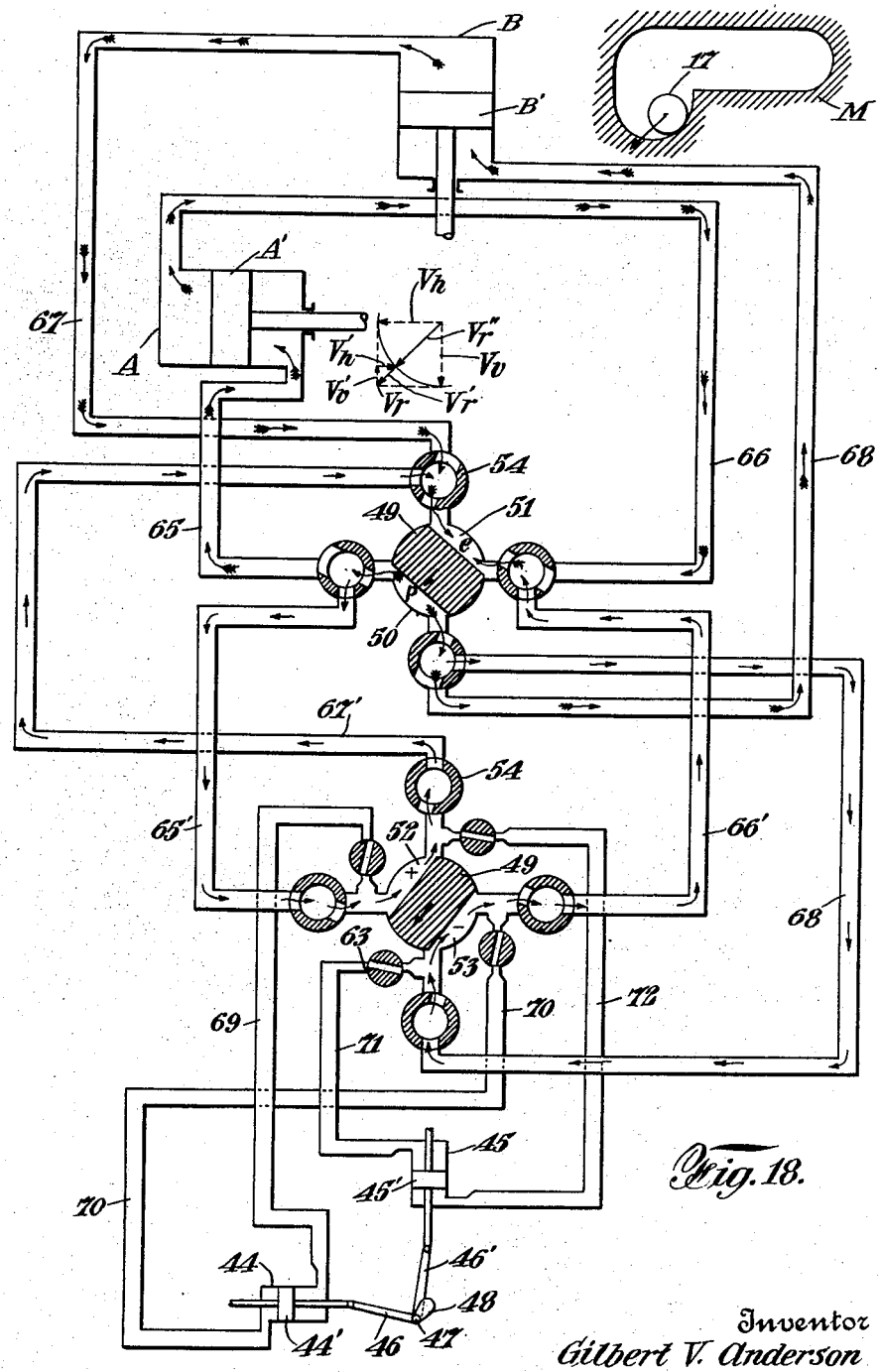

The flow of fluid into the positive opening of the auxiliary valve causes flow of fluid to the cylinder 44 causing a clockwise rotation of the distributor valve stem 49. As the motion continues the positive displacement of the tracer arm increases and clockwise rotation of the distributor valve continues until a point between 16' and 17' is reached where the horizontal passages of the main valve and the vertical passages of the auxiliary valve are opened as shown in Fig. 17, giving an added horizontal component of motion $Vh$ corresponding to the horizontal main flow produced thereby and an added vertical component of motion $Vv'$ corresponding to the vertical auxiliary flow produced thereby. This gives a further clockwise change in the direction of the resultant motion with a reduction in the amount of positive displacement of the tracer arm. In continuation of this motion the openings in the main and auxiliary valves increase, giving a further clockwise change of the resultant relative motion $Vr''$ and a still further reduction of the positive displacement until a point 18' is reached where all four openings of the main and auxiliary valves are substantially the same, giving a motion at 45° from the vertical as shown in Fig. 18 with the positive displacement of the distributor arm reduced to zero. The further action of the machine in completing the outline shown would be the same as that described, the only difference being in the actual directions involved.

It will be readily seen that the action of this machine at all times is such that in describing any outline the relative motion of the tracer with respect to the master or template is in a direction approximately at right angles to an imaginary line passing through the centre of the tracer roll and the point of contact of the same with the master and that any relative motion between the two which causes any displacement of the tracer arm from its neutral position will immediately cause a combined responsive action of the primary and secondary valve in connection with the distributor valve and an immediate change in the direction of the resultant relative motion between the two, such as would limit the displacement of the tracer arm, and that the resultant gradual rotation of the distributor valve stem would eventually give whatever change in relative motion that it required and cause the tracer arm to return to its neutral position. This action enables the applicant's milling machine to automatically at a predetermined constant feed follow the master or template and describe any conceivable shape that can be cut by a circular milling cutter.

I claim:

1. In a milling machine, a slidable carriage, a rotatable cutter carried by said carriage, a work table movable relative to said carriage provided with a master, hydraulic operated cylinders for moving said carriage and work table and a tracer mechanism, the tracer whereof follows the contour of said master for controlling said hydraulic means so that the work on said table will be cut in conformity with the contour of said master.

2. In a milling machine a slidable carriage, a rotatable cutter carried by said carriage, a work table movable relative to said carriage provided with a master, a series of hydraulic cylinders for operating said carriage and work table, a series of co-operating valve mechanisms for controlling said cylinders, a tracer mechanism carried by said carriage with the tracer of said mechanism in contact with said master and means operated by said tracer mechanism for controlling said valve mechanisms for moving the work and cutter so that the work is outlined in conformity with the outline of the master.

3. In a milling machine, a slidable carriage, a rotatable cutter carried by said carriage, a work table movable relative to said carriage provided with a master, a tracer carried by said carriage and in contact with said master, main hydraulic cylinders for transmitting motion to said carriage and table, a primary valve operated by said tracer, a secondary valve operated by said primary valve and a distributor valve mechanism provided with cylinders for rotating the same located at right angles to each other, and a valve mechanism for controlling the rate of feed of the work on said work table to the cutter.

4. In a milling machine, a slidable carriage, a cutter carried by said carriage, a work table movable relative to said carriage provided with a master and a tracer adapted to follow the contour of said master and mounted on said carriage, hydraulic means for moving the cutter relative to the work and in conformity to the contour of said master, a casing forming a pressure sump and control valve mechanisms contained within said casing operatively connected to said tracer for controlling the hydraulic means.

5. In a milling machine, a slidable carriage, a rotatable cutter carried by said carriage, a work table slidable crosswise of said carriage provided with a master, individual hydraulic motors for operating said carriage and work table and a tracer mechanism carried by said carriage contact with said master for continuously controlling both of said hydraulic motors so that the work on said table will be outlined by said cutter in conformity with the outline of said master.

6. In a milling machine a slidable carriage, a rotatable cutter carried by said carriage, a work table slidable crosswise of said carriage provided with a master of hydraulic cylinders for operating said carriage and work table, co-operating valve mechanisms for controlling said cylinders, a tracer mechanism carried by said carriage contact with said master and an hydraulic circuit activated by said tracer mechanism for controlling said valve mechanisms for moving the work and cutter so that the work is outlined in conformity with the outline of the master.

7. In a milling machine, a slidable carriage, a rotatable cutter carried by said carriage, a slidable work table provided with a master, a tracer carried by said carriage and in contact with said master, a primary valve operatively connected to said tracer, a secondary valve operated by said primary valve and a distributor valve mechanism controlled by said secondary valve for controlling the relative motion between said carriage and said work table to direct said cutter in the outline of said master.

8. In a milling machine, a slidable carriage, a rotatable cutter carried by said carriage, a work table slidable crosswise of said slidable carriage provided with a master, a tracer carried by said carriage and in contact with said master, main hydraulic cylinders for transmitting motion to said carriage and table, a primary valve operated by said tracer, a secondary valve operated by said primary valve and a distributor valve mechanism provided with cylinders for rotating the same located at right angles to each other, and a valve mechanism for controlling the rate of feed of the work on said work table to the cutter.

9. In a milling machine, a slidable carriage, a cutter carried by said carriage, a work table slidable crosswise of said carriage provided with a master and a tracer on said carriage and in contact with said master, hydraulic means for moving the cutter relative to the work and in conformity to the outline of said master, a casing forming a pressure sump and control valve mechanisms contained within said casing operatively connected to said tracer for controlling the hydraulic means.

10. In combination with a milling machine, hydraulic means including an hydraulically operable motor and an hydraulic impelling circuit therefor for imparting relative motion between the milling cutter and the work, and means for controlling the operative effect of the circuit with respect to the motor including a rotatable distributor valve mechanism having a main valve for controlling the approximate motion between the cutter and the work and an auxiliary valve for modifying the motion between the cutter and the work to obtain the required resultant motion.

11. The combination in an automatic profile milling machine of a distributor valve mechanism consisting of a main and an auxiliary valve and hydraulic cylinders for rotating said distributor valve mechanism and hand operated means for simultaneously controlling the openings leading from said main and auxilfary valves for controlling the rate of feed of the work to the cutter.

12. In combination with an automatic profile milling machine, tracer mechanism comprising a tracer head and a tracer arm the axis of which is inclined to the axis of the tracer head when in its neutral position.

13. The combination in an automatic hydraulic profile milling machine of a tracer mechanism comprising a tracer head and a tracer arm, the axis of which is inclined to the axis of the tracer head when in its neutral position and hydraulic means for controlling the profiling operation of said machine controlled by movements of said tracer arm toward and away from its neutral position.

14. In a contour reproducing mechanism, a carriage, a reproducing device on said carriage, a work table provided with a template, a series of hydraulic cylinder mechanisms for providing relative movement between said carriage and said work table, a series of cooperating valve mechanisms for controlling said cylinder mechanisms, a tracer cooperating with said template, and means operated by said tracer for controlling said valve mechanisms for moving the work and reproducing device so that the work is outlined in conformity with the outline of the template.

15. In a profile milling machine provided with a tracer and cutter, the combination of a work table with a pattern mounted thereon, hydraulic means for providing relative motion between the cutter and work table in one direction, hydraulic means for providing relative motion between the cutter and the work table in any direction different from the first direction, means actuated by deflection of the tracer due to contact between the tracer and the pattern to operate said first and second recited means simultaneously whereby the direction of relative movement is varied in accordance with said deflection and means to automatically maintain continuous contact between the tracer and the pattern.

16. In a profile milling machine provided with a tracer and cutter, the combination of a work table with a pattern mounted thereon, hydraulic means for providing relative motion between the cutter and work table in one direction, hydraulic means for providing relative motion between the cutter and the work table in any direction different from the first direction, hydraulic means actuated by contact between the tracer and the pattern to operate said first and second recited means simultaneously and means to automatically maintain continuous contact between the tracer and the pattern.

17. In a milling machine, the combination of a cutter and a tracer mounted in fixed operating relationship to each other, a work table supporting both the pattern to be followed and the work to be cut, means for producing continuous relative movement in any direction between the pattern and the tracer, means actuated by the tracer for controlling the first named means and additional means for automatically maintaining contact between the tracer and the pattern at all times during the progress of the work.

18. In a milling machine, the combination of a cutter and a tracer mounted in fixed operating relationship to each other, a work table supporting both the pattern to be followed and the work to be cut, a plurality of hydraulic motors for producing continuous relative movement in any direction between the pattern and the tracer, means actuated by the tracer for controlling the said hydraulic motors and additional means for automatically maintaining contact between the tracer and the pattern at all times during the progress of the work.

19. In a milling machine, the combination of a cutter and a tracer mounted in fixed operating relationship to each other, a work table supporting both the pattern to be followed and the work to be cut, hydraulic means for producing relative movement in any direction between the pattern and the tracer, hydraulically operable means actuated by the tracer for controlling the first named means and additional means for automatically maintaining contact between the tracer and the pattern at all times during the progress of the work.

20. In a milling machine, the combination with a cutter and a work support, of means affording relative movement of said cutter and said support in two angularly related paths, hydraulic means for producing said relative movements in said angularly related paths, means for hydraulically controlling the movement in each of said paths at a positively determined rate and means for individually varying such rates in each of the respective paths.

21. In a milling machine, the combination with a cutter and a work support, of means affording relative movement of said cutter and said support in two angularly related paths, hydraulic means for producing said relative movements in said angularly related paths, means for hydraulically controlling the movement in each of said paths at a positively determined rate, and means for varying in inverse proportion the rates of movement in the respective paths.

22. In a milling machine, the combination with a cutter and a work support, of means affording relative movement of said cutter and said support in two angularly related paths, hydraulic means for producing said relative movements in said angularly related paths, means for hydraulically controlling the movement in each of said paths at a positively determined rate, means for individually varying such rates in each path, and supplemental means for automatically controlling the operation of the rate varying means.

23. The combination with a machine tool including a cutter and a work support, of an hydraulic actuating system for effecting relative movement of the cutter and work support, said system including a main circuit to effect movement in a predetermined path and an auxiliary circuit to correct for deflections of the cutter from said path caused by undue work resistance reacting on the main circuit of the hydraulic system.

24. An hydraulic actuating system for controlling a machine tool having two slides movable in angularly related paths, including a main circuit and an auxiliary circuit, and means for rendering the two circuits interchangeably effective primarily along the one or the other of the paths of movement of the two slides.

25. A reproducing device, comprising a movable pattern and a movable work piece whereon the pattern is to be reproduced, and means under the command of the pattern for operating upon the work piece, comprising a tool, a fluid motor commanding the tool, and valve means controlling the operation of the motor connected to be controlled by the movement of the pattern.

26. A reproducing device, comprising a movable work piece and a movable pattern, a tool to engage the work piece, a fluid motor to control the movement of the tool, and connections comprising levers one of which engages the pattern for controlling the motor to cause the tool to reproduce the pattern on the work piece.

27. In a metal forming machine including a tool and a support therefor actuated by the machine in causing the tool to perform a cutting operation, means by which the tool is caused to traverse a predetermined path to form the work corresponding to the form of a pattern, comprising a tool actuating element, a fluid pressure actuated means therefor comprising a tracer having a deflectable member arranged to traverse the pattern as the tool is caused to traverse the work, a support for the tracer in mechanically fixed relation with a support for the tool, and means whereby movement of the contact member relative to its support in a direction at an angle to its direction of movement in traversing the pattern applies fluid pressure to the tool actuating element to move the tool to a like extent.

28. In a metal forming machine including a tool actuated by the machine in performing a cutting operation, means by which the tool is caused to traverse a predetermined path to form the work corresponding to the form of a pattern, comprising a tool actuating element supported by the machine, a control means therefor, including a tracer supported in mechanically fixed relation with the tool and arranged to traverse the pattern as the tool actuating element is moved to cause the tool to traverse the work, hydraulically actuated mechanism for operating the tool actuating element, and means whereby movement of the tracer in a direction at an angle to its direction of movement in traversing the pattern actuates the hydraulic mechanism to move the tool to a like extent.

29. In a metal forming machine including a tool support and a work support and means for causing a relative movement of the tool and the work for performance of a cutting operation, means for causing a movement of the tool relative to the work in a direction other than the direction of relative movement of the tool in the cutting operation, comprising a tool engaging element, a hydraulically actuated element associated therewith, means for controlling the application of hydraulic pressure to the said hydraulically actuated element comprising a model or pattern having a form corresponding to that which it is desired to reproduce in the work, a tracer element for traversing the pattern as the tool traverses the work, means associated with the tracer element for modifying an hydraulic pressure effect, and means operable by said modified pressure effect for controlling application of the pressure to said hydraulically actuated element whereby the extent of movement of the tool by the hydraulically controlled means corresponds to that of the tracer element.

30. In a metal forming machine including a tool for performing a cutting operation, power means associated with the machine for relatively moving the tool and work in a first definite path to perform the cutting operation, a tracer element pattern correspondingly movable, a movable contact on the tracer, hydraulic means associated with the tool and tracer whereby movement of the contact in a direction at an angle to its predetermined path of movement in relation to the pattern by the machine positions the tool relative to the work during the cutting operation, a means of supply of liquid pressure to the said hydraulic means to rigidly hold the tool from movement under pressure except through movement of the contact in a direction at an angle to its predetermined path of relative movement.

31. In a metal forming machine including a tool and a support therefor, a support for the work to be operated upon, and means for effecting the relative movement of the supports and thus of the work and tool in a cutting path, means by which the tool is caused to vary its position in the relative traverse of tool and work in said cutting path and thereby form the work corresponding to the form of a pattern, said means comprising a pattern associated with the work, and a tool actuating element associated with the tool whereby the tool actuating element and pattern are relatively moved in a path corresponding to the said cutting path of the tool and in fixed relation therewith during the cutting operation of the tool, and a fluid pressure actuated control means for said tool actuating element to vary its position in said path including a tracer riding in contact with the pattern during relative movement of the tool and work in the cutting path.

32. In a metal forming machine a work support, a cutting tool, a support therefor relative to which the tool is movable in a single plane, means for effecting movement of one of said supports by movement of which support the tool and work are moved one with respect to the other in a cutting path, means for causing movement of the tool relative to its support and thus to vary its position relative to the surface of the work being formed, comprising a tracer element, a support for the tracer element movable in a fixed relation with the tool in its movement causing the tool to traverse a cutting path, and a hydraulic means between the tracer and the tool so arranged that variation of the tracer relative to its support caused by relative shifting of the pattern and tracer element support positions the tool by hydraulic pressure relative to its support in the relative movement of the tool and work in the first mentioned cutting path.

33. In a metal forming machine including a work support, a tool, and a support therefor, in which one of the supports is moved to cause relative traverse of the work and tool in a cutting path, means by which the tool is caused to vary its position in respect to said cutting path, comprising a tracer element, a pattern having a surface shaped corresponding to the shape to be formed on the work, a support for the tracer in fixed relation with the tool support and movable therewith, a hydraulically controlled means holding the tool in a position relative to the surface of the work, and hydraulic means in conjunction with the tracer element actuated by movement of the tracer with respect to its support and thus out of predetermined fixed relation with the tool to control the said hydraulic holding means for the tool to likewise move the tool in a direction transverse to the first mentioned cutting path whereby variation of the position of the tracer in the relative traverse of pattern and tracer causes the tool to assume a like position under hydraulic pressure in the relative traverse of tool and work.

34. In an apparatus for controlling the path of resultant movement of a cutting tool and work in which there is a fixed path of relative movement of the tool and work in one plane and the position of the tool may be varied in a plane at an angle to said fixed path, a control device for varying the position of the tool during relative movement in said fixed path comprising a pattern, the form of which is to be reproduced in the work, a controlling device fixed in its movement in the same plane as the tool is fixed in its movement, including a pattern engaging element, and means controlled by movement of the pattern engaging element caused by relative traverse of the element and pattern in the fixed plane of relative movement of the tool and work to thereby actuate the tool engaging element to cause variation of the position of the tool in a plane at an angle to said fixed plane of movement to thereby shape the work to correspond exactly to the pattern.

35. In a metal forming machine including a tool and work support arranged to cause a relative traverse of the work and the tool, hydraulically controlled mechanism for moving the tool in a direction of other than the direction relative traversing movement of the tool and the work, comprising a cylinder and a piston therein, a rod rigidly connected with the piston and the tool whereby the position of the piston in the cylinder determines the position of the tool, a pattern, a tracer element arranged to traverse the pattern as the tool traverses the work, means movable to cause a flow of fluid simultaneously to one side of the said piston and from the other side to cause movement thereof, a power means for moving said movable means, and means whereby movement of the tracer element in a direction other than the direction of movement thereof in traversing the pattern applies the power to cause movement of the piston and consequently of the tool to the exact or proportional extent corresponding to the extent the tracer element is caused to move in traversing the pattern.

36. In apparatus of the character described, the combination with a metal cutting tool and a pattern the form of which is to be reproduced in the work being shaped by the tool and mechanism for causing relative movement of the tool and work in the cutting operation, of mechanism for causing the tool to take a varied path in the cutting movement comprising a mounting on which the tool is movable in a direction other than the first mentioned direction of relative movement of the tool and work in the cutting operation, a tracer element for contacting the pattern, a fluid pressure controlled mechanism by which the tool is rigidly supported at any point in its mounting, means actuated by the tracer element to cause application of pressure to the fluid pressure controlled mechanism to move the tool including a valve structure permitting application of pressure and consequent movement of the tool to a distance exactly corresponding to the movement of the tracer element.

37. In mechanism for controlling the resultant path of movement of a metal cutting tool in a metal working machine having a means for causing a relative movement of the tool and the work along a first path, means for predetermining path of relative movement of the tool and work, comprising a tracer element and a pattern movable one relative the other as the tool and the work are relatively moved, a hydraulically controlled apparatus for positioning the tool relative to the surface of the work being formed, means for producing a flow of fluid under pressure, and means operable through movement of the tracer element to apply the fluid under pressure in a manner to actuate the hydraulic means of the tool to move the tool to a like extent.

38. In a machine for producing on a work piece a contour or profile corresponding to that of a pattern or master, the combination with a tracer and a master, of means mounting said parts for relative movement in angularly related directions whereby any component directional movement may be effected, a cutter mounted in definite relation to one of said two first mentioned parts, and a work piece correspondingly mounted as respects the other of said parts whereby said cutter and work piece are adapted to be operatively shifted one with respect to the other for production of a surface on a work piece held by the support corresponding to the master, hydraulic actuating means for effecting relative movement of the work and cutter in one of said directions, a control valve mechanism for regulating the operative effect of said hydraulic actuating means, the tracer having a portion automatically maintained in engagement with the master and being operative when shifted by engagement with the master to determine the action of the control valve mechanism and thus the hydraulically effected relative movement of the parts.

39. A tracer control mechanism including a tracer and a follower, an actuating circuit including a variable fluid resistance element and connections between the follower and said resistance element to vary the effect thereof whereby the operative effect of the actuating circuit is modified.

40. An hydraulic tracer control mechanism including a tracer and a follower, an hydraulic actuating circuit including a variable fluid resistance element and connections between the follower and said resistance element to vary the effect thereof whereby the operative effect of the actuating circuit is modified.

41. An hydraulic tracer control mechanism including a tracer and a follower, an hydraulic actuating circuit including a variable fluid resistance element, connections between the follower and said resistance element to vary the effect thereof whereby the operative effect of the actuating circuit is modified, an operating circuit and means shiftable by modifications of the actuating circuit for varying the effect of the operating circuit.

42. A tracer mechanism for control of relative movement of a cutter and work piece, comprising a movable follower, a control device moved thereby, means for effecting said relative movement, and control connections between the device and said means including a fluid amplifier for increasing the sensitivity of reaction of the means as respects the movement of the device.

43. The combination with a tool support and a work support, and means mounting said parts for bi-directional relative movements, power mechanism for effecting said movements, control means positionable to effect a combined continuous relative movement of the parts in any selected radial direction, and pattern responsive means for effecting and maintaining any desired positioning of the control means whereby a desired relative directional movement may be automatically effected.

44. The combination with a tool support and a work support, and means mounting said parts for bi-directional relative movements, power mechanism for effecting said movements, control means positionable to effect a combined continuous relative movement of the parts in any selected radial direction, pattern responsive means for effecting and maintaining any desired positioning of the control means whereby a desired relative directional movement may be automatically effected, and additional means to compensate for abortive fluctuations of the parts from the prescribed path.

45. A tracer control mechanism for machines, including a pattern shiftable contact member, a control circuit, means for variably resisting fluid flow in said circuit, operative connections between the contact member and said means for varying the resistance as the contact member is shifted, an actuating circuit, and means responsive to said resistance variations for determining the operative effect of the actuating circuit.

46. A tracer control mechanism for a machine tool slide, including a pattern controllable movable contact member, a control circuit including a pair of variable fluid resistances, means operable by movement of the control member for varying the differential between said resistances, and means responsive to the variations in said differential for determining the movement of said slide.

47. The combination with a hydraulically operable machine tool slide, and a valve for controlling the movement of the slide, of an hydraulic circuit for determining the position of the valve, a variable fluid resistance for altering the effective pressure in the circuit connections between said resistance and the contact member for varying the pressure in accordance with movements of the contact, and connections between the circuit and valve for amplifying movement of the valve as respects the movement of the contact.

48. A tracer mechanism for control of an hydraulically operated slide including a movable pattern contact, a valve for controlling two directional movements of the slide operable by movement of the contact, and means responsive to minute movements of the contact for effecting an amplified movement of the valve.

49. In a profile milling machine, the combination of a rotating cutter and a support therefor, the axis of said cutter being in stationary position relative to said support, a work table on which the pattern to be followed and the work to be cut are mounted in stationary position relative thereto, means for producing relative motion between the work and the cutter, and a tracer mechanism for motivating said means including an oscillating movable element contactive with the pattern and normally positioned intermediate its extreme positions and adapted to activate the tracer mechanism in response to both positive and negative displacements from said normal position, means energized by the activation of the tracer mechanism for effecting responsive movement of the pattern in opposite direction to the deflection of the element thereby maintaining contact between said movable element and the pattern whether the contour of the pattern being traversed is advancing toward or receding from said contacting movable element.

50. In a machine for reproducing work in conformity to a pattern, the combination of a tracer mechanism including a movable element contacting with the pattern, a cutter, a work support, means including motors for effecting relative movements of said cutter and said support simultaneously in angularly related paths, and means cooperating with said tracer mechanism for controlling the operation of said motors to effect a resultant movement along a path conforming to the contour of the pattern and at a positively predeterminable and substantially constant rate measured along said resultant path.

51. In a profile milling machine, the combination of a rotating cutter and a support therefor, the axis of said cutter being in stationary position relative to said support; a work table on which the pattern to be followed and the work to be cut are mounted in stationary position relative thereto; means for effecting relative motion between said work table and said cutter in two angularly related directions; means for co-ordinating said angularly related movements to produce a resultant movement in any desired direction; and a tracer mechanism for controlling said last named means, including an oscillating movable element contactive with the pattern and responsive to variations in the contour of the pattern as it traverses the surface thereof, said movable element having a normal intermediate position effective to maintain a selected relative directional movement of the table and cutter and being adapted for both positive and negative displacements therefrom, said positive and negative displacements activating said tracer mechanism and causing contrariwise modifications of the directional movements of the table and tool, one with respect to the other.

52. The combination with a tool support and a work support, and means mounting said parts for bi-directional relative movements in two angularly related paths, power mechanism for effecting said movements, a pattern carried in fixed position by one of the supports and a tracer unit carried by the other of said supports in fixed position with respect thereto, said tracer unit supporting a pattern engageable tracer mounted for movement with respect to its unit, and means automatically urging and maintaining the tracer in contact with the pattern during the relative movement of the tool support and work support, said tracer having a central position effective to determine a given rectilinear relative movement of the parts and effective on deflection of the tracer by the pattern in one direction for correspondingly varying the direction of relative movement of the parts and effective on automatic deflection in the opposite direction due to recession of the contour of the pattern for correspondingly modifying the relative direction of power movement of the parts.

53. In a control mechanism, a fluid pressure source, a conduit for fluid under pressure, means effective to establish a first resistance to flow through the conduit, means effective to establish a second resistance to flow through the conduit, a pressure chamber coupled with the conduit intermediate said resistances, and means operatively associated with said resistance effecting means to simultaneously vary the effect thereof whereby to modify the pressure in the chamber.

54. In a machine tool, the combination with a work support, a work engaging member, and means supporting said parts for movement one with respect to the other, of a fluid control system for said movement including a fluid conduit, means for supplying fluid under pressure to the conduit, a pressure chamber associated with the conduit, shiftable control means operatively associated with the chamber, a plurality of variable resistances to fluid flow in the conduit jointly effective to modify the pressure in the chamber, and means, operative on movement of the engaging member with respect to the work support, for simultaneously varying said resistances, whereby the pressure modification will react on the control means to determine the extent of said movement.

55. In an hydraulic system, the combination with pressure creating means, of a fluid medium adapted to be circulated under pressure thereby, a conduit for the medium, a plurality of means resisting discharge of fluid from the conduit to create variable pressure conditions therein, a pressure responsive device operable by said variations, and means for simultaneously varying said resistances.

56. In an hydraulic system, the combination with pressure creating means, of a fluid medium adapted to be circulated under pressure thereby, a conduit for the medium, a plurality of means resisting discharge of fluid from the conduit to create variable pressure conditions therein, a pressure responsive device operable by said variations, and means for increasing one of said resistances and simultaneously decreasing another thereof.

57. In a fluid control mechanism, the combination with a pressure source, and conduit means for conveying fluid under pressure therefrom, of coupled resistances jointly restricting the flow of fluid, means for inversely varying the effect of said resistances whereby the differential between existing pressures adjacent the respective resistances is varied, and pressure responsive means actuated by said differential variations.

58. In a fluid control mechanism, the combination with a pressure source, and conduit means for conveying fluid under pressure therefrom, of coupled resistances jointly restricting the flow of fluid, means for inversely varying the effect of said resistances whereby the differential between existing pressures adjacent the respective resistances is varied, pressure responsive means actuated by said differential variations, and a power actuatable device associated with the effect varying means for operation thereof.

59. In a hydraulically operated contouring machine, the combination of a master, a movable support therefor, the work also being mounted on said support, a hydraulic cylinder connected to said support, a carriage, a second hydraulic cylinder connected to said carriage, a tracer and a cutter on said carriage, and a hydraulic system controlled by said tracer for controlling said cylinders, said hydraulic system comprising a primary valve mechanism, a secondary valve mechanism for magnifying displacements of the primary valve, and a distributor valve mechanism for directing the flow of fluid pressure to said cylinders whereby the prescribed relative movement of cutter and work is effective in accordance with the contour of said master.

60. In a hydraulic machine of the character described, the combination of a tracer mechanism, a cutter, a support on which the tracer mechanism and cutter are mounted, a master, a second support on which the master and the workpiece are mounted, hydraulic means effecting relative movements between said supports, other hydraulic means for moving said supports relatively transversely of each other, and additional hydraulic means for controlling the first two recited hydraulic means operative by displacements of the tracer point through contact with the master.

61. In a hydraulic machine of the character described, the combination of a tracer mechanism, a cutter, a support on which the tracer mechanism and cutter are mounted, a master, a second support on which the master and the workpiece are mounted, hydraulic means effecting relative movements between said supports, other hydraulic means for moving said supports relatively transversely of each other, an independent supplemental hydraulic circuit operative by displacements of the tracer point through contact with the master, and means rendered effective by the tracer determined operation of the supplemental hydraulic circuit for determining the effect of one of the hydraulic support moving means.

62. In a hydraulic machine of the character described, the combination of a tracer mechanism, a cutter, a support on which the tracer mechanism and cutter are mounted, a master, a second support on which the master and the workpiece are mounted, hydraulic means effecting relative movements between said supports, additional means for moving said supports relatively transversely of each other, and hydraulic means for controlling both said previously recited means operative by displacements of the tracer point through contact with the master.

63. In an hydraulic contouring machine, the combination of a tracer mechanism, a tool, a support on which said tracer mechanism and said tool are mounted, a master, a second support on which the master and the workpiece are mounted, hydraulic means for effecting relative movements between said supports, other hydraulic means for effecting relative transverse movement between said supports, additional hydraulic means for controlling the first two recited hydraulic means, said additional means being operative by displacements of the tracer point through contact with the master, and means for maintaining the rate of feed of the milling tool at a substantially constant velocity with respect to the path across the face of the master traced by the tracer point in constant contact therewith.

64. In a machine for contouring, the combination of a tracer mechanism, a cutter, a support on which said tracer mechanism and said cutter are mounted, a master, a second support on which the master and the workpiece are mounted, means for effecting relative movements between said supports, means for effecting relative transverse movements between said supports, additional means for controlling the first two recited means operative by displacements of the tracer point under influence of the master, and means for maintaining the rate of feed of the cutter at a substantially constant rate with respect to the path across the face of the master traced by the tracer point in constant contact therewith.

65. In a contouring machine, the combination of a tracer mechanism, a tool, a support on which said tracer mechanism and said tool are mounted, a master, a second support on which the master and the workpiece are mounted, means for effecting relative movements between the two supports both towards and away from each other and transversely of each other, means for controlling the first recited means operative by displacements of the tracer point through contactive engagement with the master, and means for maintaining the rate of feed of the milling tool substantially constant relative to the path across the face of the master traced by said point.

66. In an hydraulic machine of the character described the combination with a tracer and a master, of means mounting said parts for relative movement in angularly related directions whereby any component directional movement may be effected, a cutter mounted in definite relation to one of said two first mentioned parts, and a work support correspondingly mounted as respects the other of said parts whereby said cutter and work support are adapted to be operatively shifted one with respect to the other for production of surface on a workpiece held by the support corresponding to the master, hydraulic actuating means for effecting the relative movement of the parts, a control valve mechanism for regulating the said relative movements to maintain a substantially constant relative rate of movement of the parts irrespective of the direction of path thereof, said valve means including by-pass devices for controlling the velocity of the component motions produced by the hydraulic actuating means.

67. In a milling machine, a slidable carriage, a rotatable cutter carried by said carriage, a work support provided with a master, hydraulically operated mechanism for producing relative motion between the carriage and work support, a tracer mechanism, the tracer whereof follows the contour of said master for controlling said hydraulically operable mechanism so that the work on said support will be cut in conformity with the outline of said master, and a governor device working in conjunction with said tracer mechanism to appreciably slow or stop the carriage upon the encountering of unusually sharp contours by said tracer in said master.

68. In a milling machine, a movable carriage, a movable cutter carried by said carriage, a work support provided with a master, hydraulic means for relatively moving said carriage and work support, a tracer mechanism carried by said carriage having the tracer thereof in contact with said master for controlling said hydraulic means so that the work on said support will be outlined by said cutter in conformity with the outline of said master, and a governor device incorporated in and operating in conjunction with said tracer mechanism for appreciably slowing and even stopping the carriage when the tracer encounters unusually sharp declinations and eminences in the master.

69. In a milling machine, a movable carriage and a movable cutter carried by said carriage, a master supported adjacent said carriage, a pressure fluid system including actuating means which is actuated by force of the pressure to effect a relative rectilinear traversing movement of the carriage and the master, and means controlled by abrupt contours in the master to variously throttle the pressure applied to said actuating means and thereby vary the rate of movement.

70. In a milling machine, a movable carriage and a movable cutter carried by said carriage, a master supported adjacent said carriage, a pressure fluid system including a driving cylinder and piston for utilizing the pressure to move the carriage with respect to the master, and means controlled by abrupt contours in the master to variably throttle the fluid flow to said cylinder and thereby vary the pressure on the piston and consequently the rate of movement of the carriage.

71. In a milling machine, a movable carriage and a cutter carried by said carriage, a master supported adjacent said carriage, a pressure fluid system including actuating means which is actuated by force of the pressure to effect a relative rectilinear traversing movement of the carriage and the master, a tracer to follow the contour of said master, said tracer being movable by virtue of its encountering unevenness in the contour of the master, and means which is actuated by pronounced movements of the tracer as when encountering abrupt configurations in said contour to vary the pressure applied to said actuating means and thereby vary the rate of relative movement of said carriage and master.

72. In a milling machine, a movable carriage and a movable cutter, pressure fluid-operated means for moving the carriage at a uniform rate in one direction, a master which is fixedly supported with respect to said carriage, a tracer to follow the profile of said master, and means responsive to unusually pronounced in and out movements of the tracer to diminish the fluid flow to said pressure fluid-operated means and consequently slow the carriage.

73. A machine of the character described, including a pair of fluid operable motors for effecting relative movements of a work piece and cutter, a tracer head, a tracer point carried thereby for movement relative thereto, and valve means, responsive to movement of the point with respect to the head, for determining the fluid flow as respects both of the motors.

74. A machine of the character described, including a pair of fluid motors for effecting relative movements of a work piece and means for operating thereon, a tracer head, a tracer point carried thereby for movement with respect thereto, a first valve member for determining the flow of actuating fluid as respects one of the motors, a second valve member for determining the flow as respects the other motor, and means, effective on movement of the point with respect to its head, inversely to vary the effective positions of said valve members whereby one of said motors will be accelerated when the other is decelerated.

GILBERT V. ANDERSON.